(12) United States Patent
Dutta

(10) Patent No.: US 11,831,553 B2
(45) Date of Patent: Nov. 28, 2023

(54) DISTINGUISHING TRAFFIC-ENGINEERED PACKETS AND NON-TRAFFIC-ENGINEERED PACKETS

(71) Applicant: Nokia Solutions and Networks OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 13 days.

(21) Appl. No.: 17/377,874

(22) Filed: Jul. 16, 2021

(65) Prior Publication Data
US 2023/0014888 A1 Jan. 19, 2023

(51) Int. Cl.
*H04L 47/2441* (2022.01)
*H04L 47/6295* (2022.01)

(52) U.S. Cl.
CPC ...... *H04L 47/2441* (2013.01); *H04L 47/6295* (2013.01)

(58) Field of Classification Search
CPC . H04L 47/24; H04L 47/2408; H04L 47/2441; H04L 47/50; H04L 47/621; H04L 47/6295; H04L 47/72; H04L 47/726; H04L 45/38; H04L 45/72; H04L 45/74
See application file for complete search history.

(56) References Cited

U.S. PATENT DOCUMENTS

| 6,876,668 | B1 * | 4/2005 | Chawla | H04L 49/90 370/468 |
| 7,680,139 | B1 * | 3/2010 | Jones | H04L 47/32 370/230.1 |
| 9,967,184 | B2 * | 5/2018 | Tantsura | H04L 45/72 |
| 10,063,475 | B2 | 8/2018 | Previdi et al. | |
| 10,237,175 | B2 | 3/2019 | Pignataro et al. | |
| 10,382,334 | B2 | 8/2019 | Previdi et al. | |

(Continued)

OTHER PUBLICATIONS

Ventre, Pier Luigi, et al. "Segment Routing: a Comprehensive Survey of Research Activities, Standardization Efforts and Implementation Results." arXiv.org preprint, arXiv:1904.03471v4 (Jan. 25, 2020): 1-36.

(Continued)

*Primary Examiner* — Mohamed A Kamara
(74) *Attorney, Agent, or Firm* — Mendelsohn Dunleavy, P.C.; Steve Mendelsohn

(57) ABSTRACT

Various embodiments providing for an indicator (termed the "Traffic Category Indicator," TCI) to be encoded into packets, different values of which can be used, e.g., to distinguish Traffic Engineered (TE) packets and non-TE packets. In an example embodiment, the TCI can be used, e.g., to configure a network node to implement different packet queues, on each link, for TE packets and non-TE packets. In embodiments corresponding to the DiffSery TE paradigm, a node can be configured to implement different queues within each Forwarding Class for each link, said different queues distinguished by different respective TCI values. Example benefits of TCI include, but are not limited to fate separation of TE and non-TE packets in a node. The TCI concept can beneficially be applied to different packet-switching technologies supporting Source Routing, such as the IP, MPLS, Ethernet, etc.

25 Claims, 12 Drawing Sheets

(56) References Cited

U.S. PATENT DOCUMENTS

| | | | |
|---|---|---|---|
| 10,469,370 | B2 | 11/2019 | Filsfils et al. |
| 10,554,537 | B2 | 2/2020 | Ceccarelli et al. |
| 10,567,270 | B1* | 2/2020 | Boyapati .............. H04L 45/22 |
| 10,601,707 | B2 | 3/2020 | Previdi et al. |
| 2003/0058871 | A1 | 3/2003 | Sastry et al. |
| 2004/0081197 | A1 | 4/2004 | Liu |
| 2007/0076599 | A1* | 4/2007 | Ayyagari ............ H04L 47/2408 370/229 |
| 2008/0186865 | A1* | 8/2008 | Yong .................... H04L 47/70 370/468 |
| 2012/0230196 | A1* | 9/2012 | Jain .................... H04L 47/70 370/235 |
| 2016/0028625 | A1* | 1/2016 | Hari .................... H04L 45/74 370/392 |
| 2019/0028399 | A1 | 1/2019 | Voit et al. |

OTHER PUBLICATIONS

Postel, J., "Internet Protocol", RFC 791, DOI 10.17487/RFC0791, <https://tools.ietf.org/html/rfc791> (Sep. 1981): 1-45.

Deering, S. et al. "Internet Protocol, Version 6 (IPv6) Specification", RFC 2460, DOI 10.17487/RFC2460, <https:// tools.ietf.org/html/rfc2460> (Dec. 1998): 1-39.

Awduche, D., et al. "RSVP-TE: Extensions to RSVP for LSP Tunnels", RFC 3209, DOI 10.17487/RFC3209, <https://tools.ietf.org/html/rfc3209> (Dec. 2001): 1-61.

Dredler, H., et al. "North-Bound Distribution of Link-State and Traffic Engineering (TE) Information Using BGP", RFC 7752, DOI 10.17487/RFC7752, <https://tools.ietf.org/html/rfc7752> (Mar. 2016): 1-48.

Filsfils, C., et al. "Segment Routing Architecture", RFC 8402, DOI 10.17487/RFC8402, <https://tools.ietf.org/html/rfc8402> (Jul. 2018): 1-32.

Bashandy, A., et al. "Segment Routing with the MPLS Data Plane", RFC 8660, DOI 10.17487/RFC8660, <https://tools.ietf.org/html/rfc8660> (Dec. 2019) 1-29.

Filsfils, C., et al. "IPv6 Segment Routing Header (SRH)", RFC 8754, DOI 10.17487/RFC8754, <https://tools.ietf.org/html/rfc8754> (Mar. 2020): 1-27.

Filsfils, C., et al. "Network Programming extension: SRv6 uSID instruction", document ID draft-filsfils-spring-net-ogm-extension-srv6-usid-04 <https://tools.ietf.org/pdf/draft-filsfils-spring-net-pgm-extension-srv6-usid-04.pdf> (Feb. 2020): 1-14.

Filsfils, C., et al. "Segment Routing Policy Architecture", document ID draft-filsfils-spring-segment-routing-policy-06 <https://tools.ietf.org/pdf/draft-filsfils-spring-segment-routing-policy-06.pdf> (May 2018): 1-34.

Filsfils, C., et al. "Segment Routing Policy Architecture", document ID draft-ietf-spring-segment-routing-policy-09 <https://datatracker.ietf.org/doc/html/draft-ietf-spring-segment-routing-policy-09> (Nov. 2020): 1-37.

Special-Purpose Multiprotocol Label Switching (MPLS) Label Values, www.iana.org, 2002 [retrieved on Oct. 15, 2021] Retrieved from the Internet: < URL: https://www.iana.org/assignments/mpls-label-values/mpls-label-values.xhtml> (2 pages).

IEEE 802 Numbers, www.iana.org, 2013 [retrieved on Oct. 15, 2021] Retrieved from the Internet: <URL: https://www.iana.org/assignments/ieee-802-numbers/ieee-802-numbers.xhtml> (15 pages).

Juniper Networks Inc., "Junos® OS Class of Service User Guide (Security Devices)." Chapter 4—Controlling Output Queues with Forwarding Classes (Jun. 2021): 70-95.

Van De Velde, Thierry, U.S. Appl. No. 16/867,788 "Ultra Reliable Segment Routing", filed May 6, 2020, (42 pages).

Extended European Search Report and Written Opinion for corresponding European application No. 22183444.3; dated Nov. 22, 2022 (9 pages).

* cited by examiner

100

200

220

300

302

700

1000

1100

1200

DISTINGUISHING TRAFFIC-ENGINEERED PACKETS AND NON-TRAFFIC-ENGINEERED PACKETS

BACKGROUND

Field

Various example embodiments relate to communication equipment and, more specifically but not exclusively, to packet routing.

Description of the Related Art

This section introduces aspects that may help facilitate a better understanding of the disclosure. Accordingly, the statements of this section are to be read in this light and are not to be understood as admissions about what is in the prior art or what is not in the prior art.

Network nodes are typically capable of receiving and routing (e.g., delivering, transmitting, and/or forwarding) data packets. Source Routing (SR), also sometimes referred-to as "explicit path addressing," allows an ingress node to partially or completely specify the route the packet takes through the network. The explicit path is "encoded" into the packet, and the corresponding transit nodes forward the packet based on that explicit path. SR can advantageously be used to implement enhanced packet routing, e.g., offering the ability to give certain network-performance guarantees while making more-efficient use of the available network resources and providing greater scalability than some other routing technologies.

SUMMARY OF SOME SPECIFIC EMBODIMENTS

Disclosed herein are various embodiments providing for an indicator (termed the "Traffic Category Indicator," TCI) to be encoded into packets, different values of which can be used, e.g., to distinguish Traffic Engineered (TE) packets and non-TE packets. In an example embodiment, the TCI can be used, e.g., to configure a network node to implement different packet queues, on each link, for TE packets and non-TE packets. In embodiments corresponding to the DiffServ TE paradigm, a node can be configured to implement different queues within each Forwarding Class (FC) for each link, said different queues being distinguished by different respective TCI values. Example benefits of TCI include, but are not limited to fate separation of TE and non-TE packets in a node. The TCI concept can beneficially be applied to different packet-switching technologies supporting SR, such as the Internet Protocol (IP), Multiprotocol Label Switching (MPLS), Ethernet, etc.

According to an example embodiment, provided is an apparatus, comprising a network device that comprises packet-processing circuitry capable of forwarding a packet in accordance with source routing encoded in the packet, the packet-processing circuitry configured to distinguish packets belonging to a first traffic category and packets belonging to a second traffic category based on a category indicator encoded in a packet header, the packets of the first traffic category being transmitted by the network device using a respective bandwidth reservation on a communication link thereof, the packets of the second traffic category being transmitted without a bandwidth reservation; and wherein the packet-processing circuitry is configured to implement a first queue for the packets of the first traffic category and a different second queue for the packets of the second traffic category, the first and second queues being connected to feed enqueued packets into the communication link.

According to another example embodiment, provided is an apparatus, comprising a network device that comprises: at least one processor; and at least one memory including program code; and wherein the at least one memory and the program code are configured to, with the at least one processor, cause the network device at least to: encode source routing into a packet; and encode a category indicator into a header of the packet for distinguishing packets belonging to a first traffic category and packets belonging to a second traffic category, the packets of the first traffic category being transmitted through a corresponding network using one or more bandwidth reservations on one or more respective communication links thereof, the packets of the second traffic category being transmitted through the corresponding network without a bandwidth reservation.

According to yet another example embodiment, provided is a non-transitory machine-readable medium, having encoded thereon program code, wherein, when the program code is executed by a machine, the machine implements a method comprising the steps of: encoding source routing into a packet; and encoding a category indicator into a header of the packet for distinguishing packets belonging to a first traffic category and packets belonging to a second traffic category, the packets of the first traffic category being transmitted through a corresponding network using one or more bandwidth reservations on one or more respective communication links thereof, the packets of the second traffic category being transmitted through the corresponding network without a bandwidth reservation.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
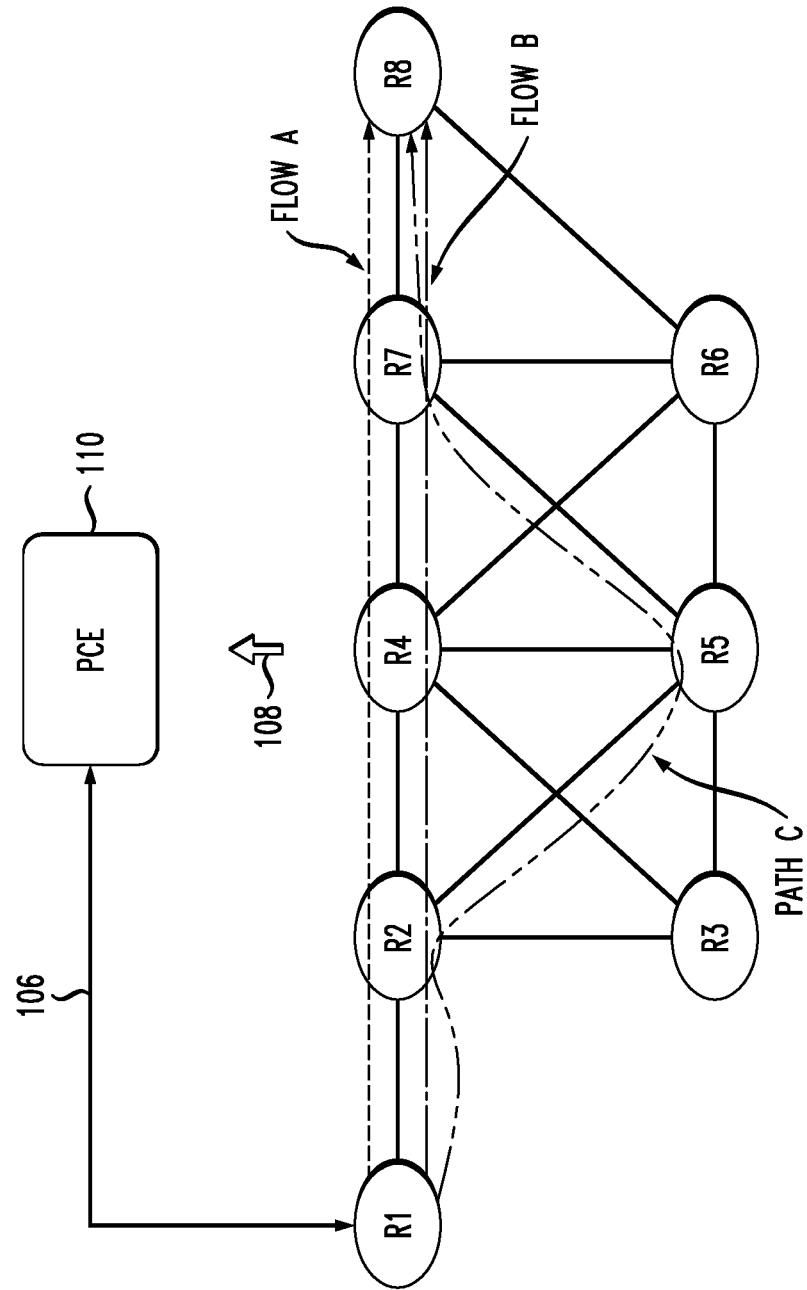
FIG. 1 shows a block diagram of a communication network in which various disclosed embodiments can be practiced.

The following acronyms/abbreviations are used in the description of various embodiments and/or in the accompanying drawings:
AF Assured Forwarding;
BE Best Effort;
BGP Border Gateway Protocol;
BW Bandwidth;
CoS Class of Service;
CR Constraint-based Routing;
CSPF Constraint Shortest Path First;
DEI Drop Eligible Indicator;
DiffServ Differentiated Services;
DSCP Differentiated Services Code Point;
DS-TE DiffServ-Aware Traffic Engineering;
ECMP Equal Cost Multiple Paths;
ECN Explicit Congestion Notification;
EF Expedited Forwarding;
EH Extension Header;
FC Forwarding Class;
FCS Frame Check Sequence;
FEC Forwarding Equivalence Class;
IANA Internet Assigned Numbers Authority;
ID Identifier;
IEEE Institute of Electrical and Electronics Engineers;
IETF Internet Engineering Task Force;
IGP Internal Gateway Protocol;
IHL Internet Header Length;
I/O Input/Output;
IP Internet Protocol;
IPv4 Internet Protocol version 4;
IPv6 Internet Protocol version 6;
L2 Layer 2;
LAN Local Area Network;
LDP Label Distribution Protocol;
LSA Link State Advertisement;
LSB Least Significant Bit;
LSP Labeled Switched Path;
MAC Media Access Control;
MPLS Multiprotocol Label Switching;
MSB Most Significant Bit;
NC Network Control;
OSI Open Systems Interconnection;
PCE Path Computation Server/Element;
PCP Priority Code Point;
QoS Quality of Service;
RED Random Early Detection;
RFC Request for Comments;
RIB Routing Information Base;
RIP Routing Information Protocol;
RSVP Resource Reservation Protocol;
SDN Software Defined Networking;
SID Segment Identifier;
SLA Service Level Agreement;
SP Segment Path;
SPT Shortest Path Tree;
SR Source Routing or Segment Routing;
TC Traffic Class;
TCI Traffic Category Indicator;
TCP Transmission Control Protocol;
TE Traffic Engineering or Traffic Engineered;
TEDB Traffic Engineering Database;
TLV Type, Length, Value;
ToS Type of Service;
TPID Tag Protocol Identifier;
TTL Time to Live;
UCMP Unequal Cost Multi-Path;
UI User Interface;
UL Upper Layer;
VLAN Virtual LAN.

Some embodiments may benefit from the use of some features disclosed in the commonly owned U.S. patent application Ser. No. 16/867,788, which is incorporated herein by reference in its entirety.

A typical data packet is a formatted unit of data that typically comprises control information and payload data. The payload data typically form the part of the data packet that is and/or carries the intended message to the corresponding (e.g., remote) data receiver. The control information is sent together with the corresponding payload data to enable proper delivery thereof by the corresponding data-transport system. Control information is typically found in packet headers and trailers, whereas payload data are typically found in the packet portion(s) located between the headers and trailers. In an example implementation, control information may include source and destination addresses, error detection codes (such as checksums), sequencing information, etc. Example data packets may be IPv6 packets, MPLS packets, and/or packets encapsulated in Ethernet frames, Wi-Fi frames, Point-to-Point Protocol frames, Fiber Channel frames, modem frames, etc.

IP routing and MPLS have distinct respective packet-forwarding mechanisms. IP routing relies on IP addresses found in packet headers to make packet-forwarding decisions. In contrast, MPLS makes packet-forwarding decisions based on short path identifiers referred-to as "labels," which are attached to packets.

IP routing generally relies on IP forwarding tables, which are generated at the respective network nodes using routing information distributed by way of one or more suitable protocols, such as the internal gateway protocol (IGP) and/or the border gateway protocol (BGP). In an example implementation, an IP forwarding table maps destination addresses to the corresponding next hops that packets are expected to take to reach their intended destinations. When a node receives a packet, the node may access the relevant forwarding table using the destination address found in the IP header and then find in the forwarding table a corresponding egress interface for the next hop. The node may then forward the packet through the egress interface. The next node that receives the packet may perform its own forwarding-table lookup using the same destination IP address, and so on.

Segment Routing is a more recent variant of SR that may be used in both IP and MPLS packet networks. Segment Routing can be implemented in distributed control-plane environments, such as the IP and MPLS control planes, and in centralized control-plane environments, such as those based on Software Defined Networking, SDN. Packet-forwarding decisions in SR can be based on instructions (referred-to as segment IDs or SIDs) inserted into packets. SIDs may be relatively short (e.g., compared to the length of an IP address or compared to a forwarding equivalence class, FEC), fixed-length identifiers. Some SIDs may correspond to topological segments of the network or certain services provided by some network nodes. The use of SR may be beneficial, e.g., because the nodes may employ very fast and yet relatively simple SR-enabled forwarding engines. In an example implementation, SR is not dependent on any specific OSI-model data-link-layer (L2) technology.

Some embodiments may benefit from the use of at least some features disclosed in: (i) IETF RFC 8402; (ii) IETF RFC 8660; (iii) IETF RFC 8754; (iv) the Internet Draft by C. Filsfils, et al., entitled "Segment Routing Policy Architecture," having the document identifier "draft-filsfils-spring-segment-routing-policy-06.txt;" (v) the Internet Draft by C. Filsfils, et al., entitled "Network Programming extension: SRv6 uSID instruction," having the document identifier "draft-filsfils-spring-net-pgm-extension-srv6-usid-04;" (vi) U.S. Pat. No. 10,063,475; (vii) U.S. Pat. No. 10,382,334; and (viii) U.S. Pat. No. 10,554,537, all of which are incorporated herein by reference in their entirety.

Some networks may not inherently provide or support the SR functionality. Even in cases where a network does support SR, there might be some portions of the network (e.g., one or more nodes thereof) that do not support SR. A useful feature provided by IPv6 is the capability to define extension headers. Extension headers are optional headers that may be used to carry additional information in a packet header. Extension headers may be placed in the packet between the fixed IPv6 header and an upper-layer protocol header, e.g., a Transmission Control Protocol (TCP) header. For example, an IPv6 SR extension header can be used to attach a SID stack and cause the packet to be forwarded accordingly by the IPv6 nodes.

Packets can enter an SR-enabled network (e.g., a network of nodes that are SR-enabled) via an ingress edge node, travel hop-by-hop along a segment path (SP) that may include one or more SR-enabled nodes, and then exit via an egress edge node. Topological segments may represent one-hop or multi-hop paths to SR-enabled nodes. Some topological segments may act as sub-paths that can be combined to form an SP. Nodes in SPs make forwarding decisions based on SIDs, as opposed to destination IP addresses of packets. A stack of SIDs can be used to represent a corresponding SP. The packet with the attached SID stack is forwarded along and can traverse the segments of the corresponding SP in the same order as the list order of the SIDs in the SID stack. A forwarding engine operating in the data plane of each SR-enabled node can use the top SID of the SID stack to look up the egress for the next hop. As the packet and the SID stack attached thereto are being forwarded along the SP in a hop-by-hop fashion, SIDs can be sequentially removed from the top of the SID stack. In some embodiments however, the attached SID stack may remain unchanged as the packet is being forwarded along the SP. In such embodiments, a suitable pointer (e.g. the IPv6 SR "Segments Left" field) or some pertinent auxiliary information may be used to identify the active SID in the SID stack. For example, such pointer can be advanced as the packet advances along the SP.

As used herein, the term "Traffic Engineering" (TE) refers to a method of optimizing the performance of a telecommunications network, e.g., by dynamically analyzing, predicting, and regulating the behavior of data transmitted over that network. TE can be used to enable the network operator to control the paths that packets take through the network, by bypassing or overriding the standard or default routing protocol, which typically relies on routing tables. For example, TE can be used to move a packet flow away from congested links to alternative links that would not have been selected by the automatically computed (e.g., destination-based shortest) path. In various implementations, TE can provide one or more the following example capabilities:

(1) Route primary paths around known bottlenecks or points of congestion in the network;
(2) Provide precise control over how the traffic is rerouted when the primary path is faced with one or more failures;
(3) Provide more-efficient use of available aggregate bandwidth (BW) and long-haul fiber by ensuring that certain subsets of the network do not become over-utilized while other subsets of the network are being underutilized;
(4) Maximize operational efficiency;
(5) Enhance certain traffic-oriented performance characteristics of the network by minimizing packet loss, minimizing prolonged periods of congestion, and/or maximizing throughput; and
(6) Improve statistically bound performance characteristics of the network, such as loss ratio, delay variation, and transfer delay, etc.

FIG. 1 shows a block diagram of a communication network 100 in which various disclosed embodiments can be practiced. Network 100 is illustratively shown as comprising eight nodes, labeled R1-R8. In operation, the nodes R1-R8 can appropriately send and receive data packets, via the corresponding links, from a corresponding source node to a corresponding destination node. In an example embodiment, each of the nodes R1-R8 can operate as an ingress node, as a relay (transit) node, and/or as an egress node.

Communication network 100 has a partial mesh topology, in which each of the nodes R1-R8 is directly connected to only some of the other nodes. However, various embodiments disclosed herein are not limited only to partial mesh topologies. For example, at least some embodiments can be adapted for a communication network having a full mesh topology, in which each of the nodes R1-R8 is directly connected to each of the other nodes. In various alternative embodiments, communication network 100 can have more or fewer than eight constituent nodes connected to one another using the corresponding full mesh topology or any desired partial mesh topology.

When functioning as an ingress node, a node Rn (where n=1, 2, . . . , 8) may operate to: (i) receive data from an external source via a corresponding peripheral link (not explicitly shown in FIG. 1); (ii) (re)packetize the received data; (iii) modulate a carrier using the packetized data; and (iv) apply the resulting modulated signal to appropriate one or more of the corresponding links. When functioning as an egress node, a node Rn may operate to: (i) receive a modulated signal from a corresponding link; (ii) extract the payload data therefrom; and (iii) direct the extracted data to an external destination via a corresponding peripheral link (not explicitly shown in FIG. 1). When functioning as a relay node, a node Rn may operate to receive a data packet via one link and then send the corresponding data packet through one or more other links.

In an example embodiment, network 100 may be configured to support the following paradigms for routing packets: (1) Shortest Path Routing; (2) Unequal Cost Multi-Path (UCMP); and (3) Explicit Path Routing.

Under the Shortest Path Routing paradigm, every node Rn of network 100 originates the status of its adjacent links and networks as Link State Advertisements (LSAs). Typically, an LSA carries identification of a link/network, cost of the link/network, etc. The LSAs can be flooded across network 100 by way of IGPs running among the nodes. As a result, each node Rn can build an identical topology database (e.g., a database of LSAs) of network 100. Node Rn can then compute paths to destinations by applying a Shortest Path Tree (SPT) algorithm to the topology stored in the topology database. An example SPT algorithm that can be used for this purpose is the so-called Djkstra's algorithm. The SPT algorithm causes a packet to be directed to a destination along the shortest path, i.e., the path to the destination through network 100 characterized by the lowest total cost. For some network topologies, there can be multiple equal-cost shortest paths to a destination. In such cases, the packet flows to the destination can be load-balanced across all equal-cost multiple paths (ECMP).

Under UCMP routing, packets to a destination are sprayed fairly (e.g., approximately evenly) across all possible paths to the destination in network 100 irrespective of the flows associated with the packets. This type of routing may provide nearly optimal utilization of certain network resources in some cases, e.g., by eliminating or reducing congestion to nearly maximize the throughput of packets. To enable UCMP routing, node Rn may compute as many maximally disjoint trees as possible to various destinations in network 100. Herein, the term "maximally disjoint trees" means that the respective links included in different one of such trees are substantially mutually exclusive. After the maximally disjoint trees are determined, packets to a destination can be load-balanced across the paths to the destination corresponding to different ones of such trees, e.g., in a round robin fashion. Note that, under UCMP routing, the costs of the load-balanced paths to the destination are typically not equal.

Under Explicit Path Routing, node Rn originates TE LSAs for each of its adjacent links. A TE-LSA may include certain parameters of the corresponding link, such as the configured bandwidth, available bandwidth, delay, color, etc., which can be used to make traffic-engineering decisions. The TE-LSAs originated by node Rn can be flooded across network 100, e.g., by way of the IGPs running among the nodes. As a result, each node of network 100 can build an identical Traffic Engineering Database (TEDB) of the network.

In operation, node Rn may sort the packets that are ingressing into network 100 into packet flows, with the sorting being based on certain fields in the packet headers or other selected characteristics of the packets. For each packet flow, a corresponding explicit path comprising a set of nodes and/or links is set up from the source node to the destination node such that the path meets the QoS requirements of the flow. Then, packets belonging to a flow are sent along the explicit path set-up in this manner for that flow. The explicit path can be computed, e.g., by executing a Constraint Shortest Path First (CSPF) algorithm on the TEDB. Once an explicit path is set-up, the dynamic TE parameters of the links along the path can be updated, e.g., to reflect the actual resources reserved for the path. For example, available bandwidth on a link is typically reduced by the amount of bandwidth consumed by the path. This change in turn triggers an updated TE-LSA for the link, which is then flooded throughout network 100.

In an example embodiment, an explicit path may be computed by the corresponding ingress node or by a centralized Path Computation Server/Element (PCE) 110. In operation, PCE server 110 may receive copies 108 of the flooded TE-LSAs and build a TEDB of network 100. One benefit of such PCE-based computation may be that the inter-IGP area TE Labeled Switched Paths (TE-LSPs) can be used as well, because PCE server 110 can be configured to receive TE-LSAs from all IGP areas of network 100.

The explicit paths may be stateful or stateless. Explicit Path Routing differs from Shortest Path Routing in that there can potentially be any number of explicit paths between a source node and a destination node under Explicit Path Routing.

Under the stateful explicit-path approach, a suitable control-plane signaling protocol may be used to set up states for the flow in the nodes along the explicit path. For example, an MPLS-based explicit path (which is sometimes referred to as the TE-LSP) can be set-up using suitable signaling protocols, such as the Resource Reservation Protocol—Traffic Engineering (RSVP-TE), Constraint-based Routing (CR) Label Distribution Protocol (LDP), etc.

A stateless explicit path may also be referred to as a source-routed path. Under the stateless explicit-path model, the nodes along the explicit path do not typically maintain states of the explicit path. Rather, the source node encodes the set of nodes/links of the explicit path onto the packet itself. Each node along the path then looks up the topmost entry in such set, pops said entry, and forwards the packet to the next-hop link represented by the entry. In this manner, the packet is sequentially directed along the links of the explicit path encoded in the packet. The computation of the explicit path in this case is preferably performed at PCE server 110. This preference is due to the fact that the paths are stateless in transit nodes, which makes it difficult for the transit nodes to account for the TE resources reserved by the paths traversing the nodes. However, the PCE server 110 is much more favorably situated to track various paths in network 100 as well as the dynamically varying use of the TE resources of the links.

Bandwidth (BW) is an example of a TE resource reservable on a link-by-link basis. A BW reservation may include: (i) allocation of packet queues; (ii) operating a packet scheduler for some or all of the queues; (iii) operating a traffic policer for some or all of the queues, e.g., to ensure that the enqueued traffic does not exceed the reserved BW, etc.

In an example embodiment, network 100 may be configured to implement TE SR using the following example processing steps:
   (A) Various TE parameter values are assigned to various network elements, such as nodes, links, etc. Different TE parameters may be used to quantify the cost, delay, throughput, available BW, packet-loss characteristics, etc., of the corresponding network element.
   (B) The topological and TE parameters of the network elements are learned, e.g., as indicated above, and can be maintained, e.g., in a TEDB hosted by PCE server 110 or by an SDN controller.
   (C) An ingress node operates to classify packets into flows based on a corresponding application or service. Each flow may be associated with a specific QoS requirement or Service Level Agreement (SLA).
   (D) The ingress node further operates to send a request to PCE server 110 to compute an optimal/explicit path that meets the corresponding specified QoS or SLA. PCE server 110 may compute such a path by running a suitable CSPF algorithm constrained by the TEDB. Once a path is computed and allocated, PCE server 110 operates to update the corresponding dynamic TE state (s) (e.g., residual BW, etc.) of the network elements along that path in the TEDB.
   (E) The ingress node then operates to send all packets belonging to the corresponding flow over the explicit path allocated at step (D). The explicit path is encoded into the packets of the flow, e.g., as indicated above. In some cases, it is possible that packets of different flows to the same destination follow different paths.

(F) Per-flow states may be maintained only at the ingress router. Transit nodes may be completely agnostic with respect to the flow, e.g., by being unaware of the corresponding QoS/SLA needs, etc. This feature may advantageously be used, e.g., to achieve a significant reduction in the cost and/or complexity of nodes.

(G) The ingress node may regulate the flow, e.g., to ensure that the traffic profile of its packets does not violate the SLA.

For illustration purposes and without any implied limitations, example embodiments are described below in reference to BW as being the pertinent TE parameter. From the provided description, a person of ordinary skill in the art will readily understand how to make and use, without any undue experimentation, various alternative embodiments corresponding to other TE parameters. In the example embodiments described herein, the TE configuration of various network elements involves specifying the BW using at least the following values: (i) Maximum BW; and (ii) Residual BW. The Maximum BW specifies the maximum BW allowance on a link. The Residual BW is computed as the difference between the Maximum BW and the total BW reserved by all TE source-routed paths traversing the link. The Residual BW is different from the available BW, as the bandwidth may also be consumed by the non-TE (e.g., Shortest Path Routing) traffic on the link. The available BW typically changes dynamically as flows are set-up and/or torn-down along the link.

As an example, FIG. 1 illustrates a traffic pattern in which node R1 sends two TE flows, labeled A and B, to node R8. For simplicity of illustration, the flows A and B are shown in FIG. 1 as following the same SR path, R1→R2→R4→R7→R8. The shortest path from node R1 to node R8, e.g., computed using Djkstra's SPF, is R1→R2→R5→R7→R8, which is labeled in FIG. 1 as path C. Node R1 may send non-TE traffic to node R8 along path C, e.g., by simply specifying the IP address of R8 as the destination address, without invoking SR.

In an example embodiment, TE in network 100 may be based on the DiffServ-Aware Traffic Engineering (DS-TE) paradigm. The per-hop behavior (i.e., forwarding class, FC) therein may be determined using the DS field in the IP header. The DS field replaces the outdated IPv4 Type of Service (ToS) field. The DS field contains the 6-bit Differentiated Services Code Point (DSCP) value. Explicit Congestion Notification (ECN) occupies the least-significant two bits of the IPv4 ToS field and IPv6 Traffic Class (TC) field. The use of FCs enables grouping of packets for transmission and assignment of packets to output queues at each node. While, in theory, a network can have up to 64 different traffic classes using the 64 available DSCP values, in practice, however, the following FCs are typically used:
  (i) Expedited Forwarding (EF): provides a low-loss, low-latency, low-jitter, assured-bandwidth, end-to-end service;
  (ii) Assured Forwarding (AF): provides a group of values one can define and includes four subclasses, AF1, AF2, AF3, and AF4, each having three different drop probabilities, e.g., low, medium, and high;
  (iii) Best Effort (BE): provides no service profile. For the BE forwarding class, loss priority is typically not carried in a Class-of-Service (CoS) value, and Random Early Detection (RED) drop profiles are more aggressive;
  (iv) Network Control (NC): this class is typically high priority because it supports protocol control.

In operation, a node may allocate an output queue for each FC. The TE parameters are assigned to various network elements per FC. The QoS specification for a flow may include respective requirements per FC. As a result, the use of DiffServ enables the node to guarantee QoS of packets at an aggregate level, i.e., per FC rather than per flow.

As an illustration, let us consider an example in which all links in network 100 are 100-Gbps links, meaning that each link has the maximum BW as 100 Gbps. Then, this maximum BW is allocated to the FCs as follows: {EF=8 Gbps, AF1=20 Gbps, AF2=AF3=20 Gbps, BE=30 Gbps, NC=2 Gbps}. Initially, when no flows are set-up in network 100, the residual BW per FC is the same as the maximum BW per FC on each link.

Let us now assume that flow A is being set-up first, and flow A requires QoS with the following BWs for the FCs: {EF=2 Gbps, AF1=5 Gbps, AF2=1 Gbps, AF3=3 Gbps, BE=5 Gbps, NC=100 Mbps}. Node R1 uses a control link 106 to send a request to PCE server 110 to compute a path from node R1 to node R8 that meets the required QoS. As indicated in FIG. 1, the computed path for flow A is R1→R2→R4→R7→R8. In response to the request, PCE server 110 also causes reservations of the FC BWs on the links traversed by the computed path. As a result, the available BW becomes: {EF=6 Gbps, AF1=15 Gbps, AF2=19 Gbps, AF3=17 Gbps, BE=15 Gbps, NC=1.9 Gbps}.

Let us further assume that flow B is being set-up next, and flow B requires QoS with the following BWs for the FCs: {EF=1 Gbps, AF1=4 Gbps, AF2=4 Gbps, AF3=5 Gbps, BE=8 Gbps, NC=200 Mbps}. Node R1 again uses control link 106 to send a request to PCE server 110 to compute a path from node R1 to node R8 that meets the required QoS. As indicated in FIG. 1, the computed path for flow B is also R1→R2→R4→R7→R8. In response to the request, PCE server 110 also causes reservations of the FC BWs on the links traversed by the computed path. After flows A and B are set-up, the residual BW on each link along the path R1→R2→R4→R7→R8 is 55 Gbps.

In a conventional implementation of network 100, an ingress node, such node R1, does not typically regulate non-TE traffic originated thereat. This lack of regulation is due to the fact that there is typically no QoS associated with non-TE traffic, which causes no reservation to be made on the corresponding resources (e.g., BW) along the traversed path. It is therefore possible that the non-TE traffic may cause oversubscription of resources along some portion of the traversed path. For example, the BW consumed by the non-TE traffic may exceed the residual BW on a link. In such a case, the node forwarding the packets on the oversubscribed link may drop packets. Since, under stateless SR, no flow-specific states are maintained at transit nodes, the transit node may likely drop packets without any discrimination as to whether a packet belongs to TE traffic or non-TE traffic. As a result, oversubscription by non-TE traffic might lead to TE-traffic packets being dropped by the transit node. Similarly, occasional oversubscription by TE traffic might lead to non-TE-traffic packets being dropped by the transit node. Such indiscriminate packet dropping represents a significant problem for conventional and/or legacy SR networks.

As an example, let us assume that, after flows A and B are set-up as indicated above, node R1 operates to send non-TE traffic to node R8 via path C. As indicated in FIG. 1, path C shares the links R1→R2 and R7→R8 with the flows A and B. In this configuration, if at some point in time the non-TE traffic consumes the BW of 60 Gbps, then each of the links R1→R2 and R7→R8 becomes oversubscribed by 5 Gbps because the residual BW on each of these links is only 55 Gbps, as indicated above. This oversubscription by non-TE traffic then may likely cause some packets of the flows A and/or B to be disadvantageously dropped, e.g., by node R7.

Various embodiments disclosed herein address at least some of the above-indicated problems in the state of the art by providing for an indicator (termed the "Traffic Category Indicator," TCI) to be encoded into packets, different values of which can be used to distinguish TE packets and non-TE packets. The TCI is different from and may be used in addition to the FC packet differentiation (also see FIG. 8). In an example embodiment, the TCI can be used to configure a transit node to implement different packet queues, on each link, for TE packets and non-TE packets. For example, the queue for the TE packets can be capped by the total reserved BW (i.e., the difference between the maximum BW and the residual BW) on the link, and the queue for the non-TE packets can be capped by the residual BW on the link. In embodiments corresponding to the DS-TE paradigm, a node can be configured to implement different packet-output queues within each FC for each link, said different queues being distinguished by different respective TCI values. Example benefits of TCI include, but are not limited to fate separation of TE and non-TE packets in a transit node. For example, if non-TE traffic is oversubscribed (e.g., exceeds the residual BW) on the link, then only non-TE packets may typically be dropped by the corresponding router or node, whereas the TE traffic is substantially unaffected by that oversubscription. On the other hand, if an ingress router fails to properly regulate a TE flow, thereby causing some TE traffic to become oversubscribed (e.g., to exceed the reserved BW) on a link, then only TE packets may typically be dropped by the corresponding router or node, whereas the non-TE traffic is substantially unaffected by that oversubscription. The TCI concept is sufficiently generic and can beneficially be applied to most packet-switching technologies, such as the IP, MPLS, Ethernet, etc., e.g., as further detailed below.

Figure 2A:
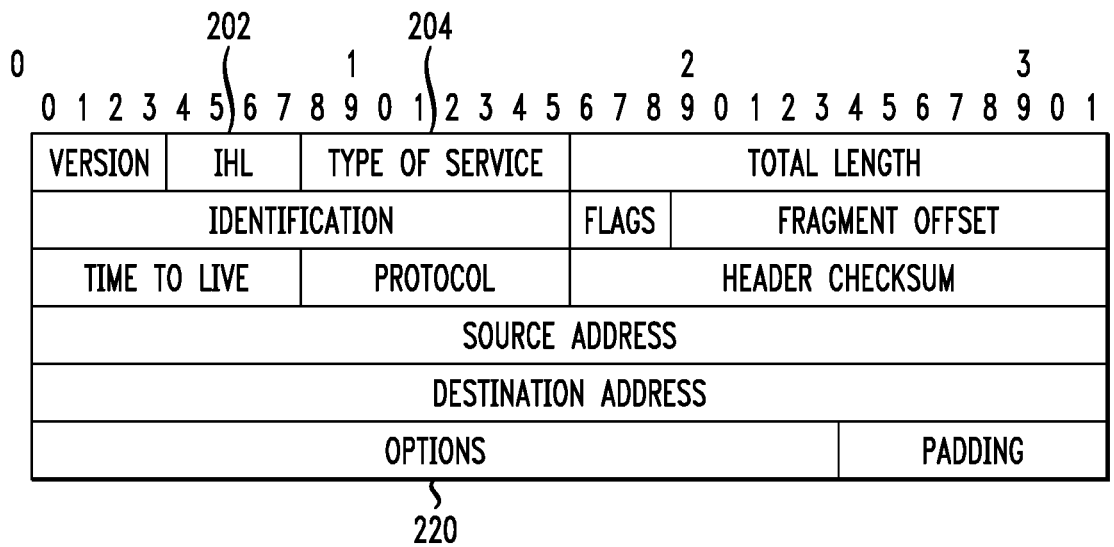
FIGS. 2A-2B schematically show a packet header of a data packet that may be transmitted in an IPv4 network of FIG. 1 according to an embodiment.
Figure 2B:
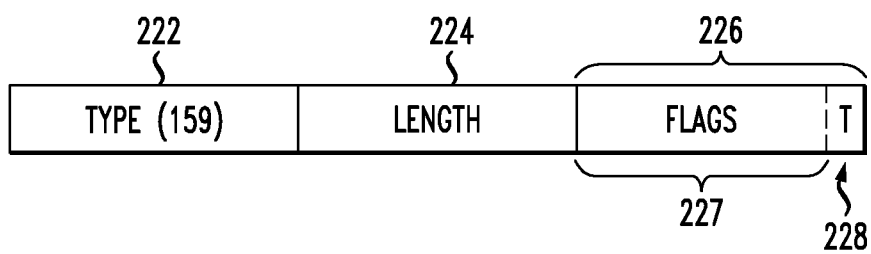

FIGS. 2A-2B schematically show a packet header 200 that may be used in some data packets transmitted in an IPv4 network 100 according to an embodiment. Header 200 includes, among other fields, a field 220 (Options) that can be configured to carry the TCI, e.g., as explained below. Under IPv4, the Options field 220 is generally used to provide for control functions needed or useful in some cases but unnecessary for certain types of communications in some other cases. For example, conventionally, the field 220 may be used to carry certain provisions for timestamps, security, and special routing.

In an example implementation, the Options field 220 starts with a 1-octet "Type" field 222 followed by type-specific encoding. The Options field 220 can be of variable length. Hence, the minimum possible size of the Options field 220 is one octet, wherein only the "Type" field is present, and the type-specific encoding is not included. The maximum possible size of the field 220 is limited by the value specified in an Internet Header Length (IHL) field 202 of header 200.

In an example embodiment, the TCI can be implemented using the Options field 220, wherein the TCI is encoded as a novel "TCI Option." In this case, as indicated in FIG. 2B, the Options field 220 comprises the above-mentioned "Type" field 222, which is followed by a 1-octet "Length" field 224 and a 1-octet "Flags" field 226.

The 1-octet "Type" field 222 can be parsed into the following three constituent fields: (i) a 1-bit field "Copied Flag;" (ii) a 2-bit field "Option Class;" and (iii) a 5-bit field "Option Number." The bit value encoded into the "Copied Flag" field indicates whether or not this particular option is copied into all fragments upon fragmentation, wherein the binary "0" means not copied, and the binary "1" means copied. The four 2-bit values, i.e., "00," "01," "10," and "11," that can be encoded into the "Option Class" field represent the following option classes: "Control," "Reserved for Future Use," "Debugging and Measurement," and "Reserved for Future Use," respectively.

In an example embodiment, the three constituent fields of the "Type" field 222 of the TCI Option can be assigned, e.g., the following values: (i) Copied Flag=1; (ii) Option Class=00; and (iii) Option Number=11111. Thus, the corresponding full octet of the "Type" field 222 is "10011111," which has the decimal value of 159, as indicated in FIG. 2B. The "Copied Flag" bit value of 1 means that the TCI option is going to be copied into all fragments when the IPv4 packet carrying the option is fragmented by a router.

The 1-octet "Length" field 224 is used to indicate the total length of the Options field 220. Since, in this particular embodiment, each of the fields 222, 224, and 226 is 1-octet long, the value encoded into the "Length" field 224 can be the decimal 3.

The 1-octet "Flags" field 226 is parsed into a seven-bit most-significant-bit (MSB) portion 227 and one least-significant bit (LSB) 228. The LSB 228 carries the binary "T" value, which can be interpreted as follows: (i) if T=1, then the corresponding IPv4 packet belongs to TE traffic; and (ii) if T=0, then the corresponding IPv4 packet belongs to non-TE traffic. The MSB portion 227 may be encoded with the "0000000" value and ignored by the nodes.

When a packet router routes an IPv4 packet, the router may operate to check whether or not the TCI option is present, i.e., whether or not the "Type" field 222 has the decimal value of 159 encoded therein. If the "Type" field 222 is encoded with 159, then the router further operates to distinguish TE and non-TE packets based on the T-value carried by the LSB 228 in the "Flags" field 226 of the Options field 220.

Figure 3A:
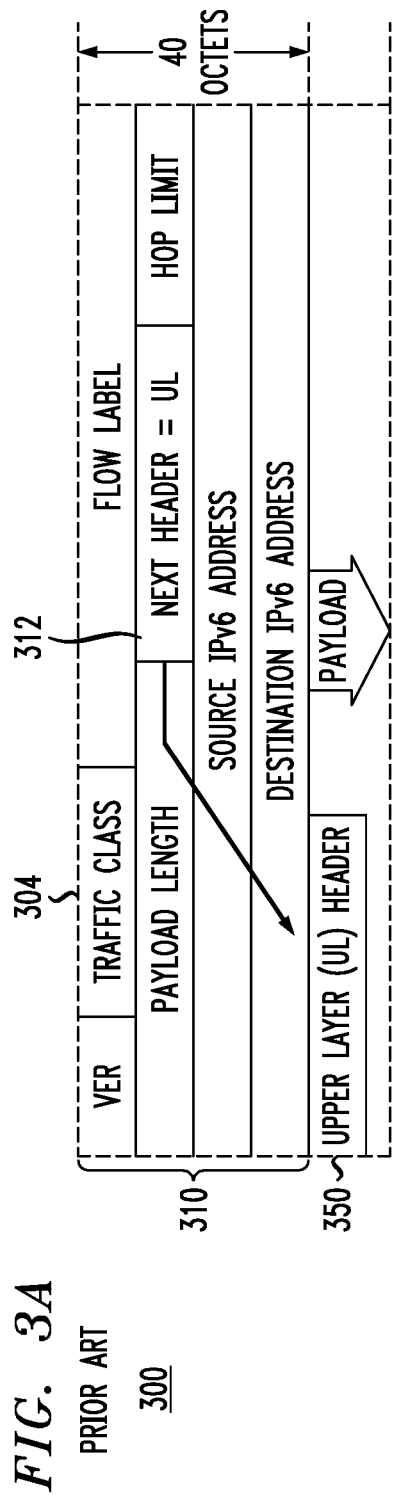
FIGS. 3A-3E schematically illustrate a data packet that may be transmitted in an IPv6 network of FIG. 1 according to an embodiment.

FIGS. 3A-3E schematically illustrate a data packet 302 that may be transmitted in an IPv6 network 100 according to an embodiment. More specifically, FIG. 3A schematically shows a prior-art data packet 300, which does not have an IPv6 extension header therein. FIGS. 3B-3E schematically show an example structure of data packet 302 produced, e.g., by inserting extension headers into data packet 300 of FIG. 3A as generally provided in the Internet Protocol, Version 6 (IPv6) Specification, RFC 2460, and explained in more detail below in reference to FIGS. 3B-3E. RFC 2460 is incorporated herein by reference in its entirety.

Figure 3B:
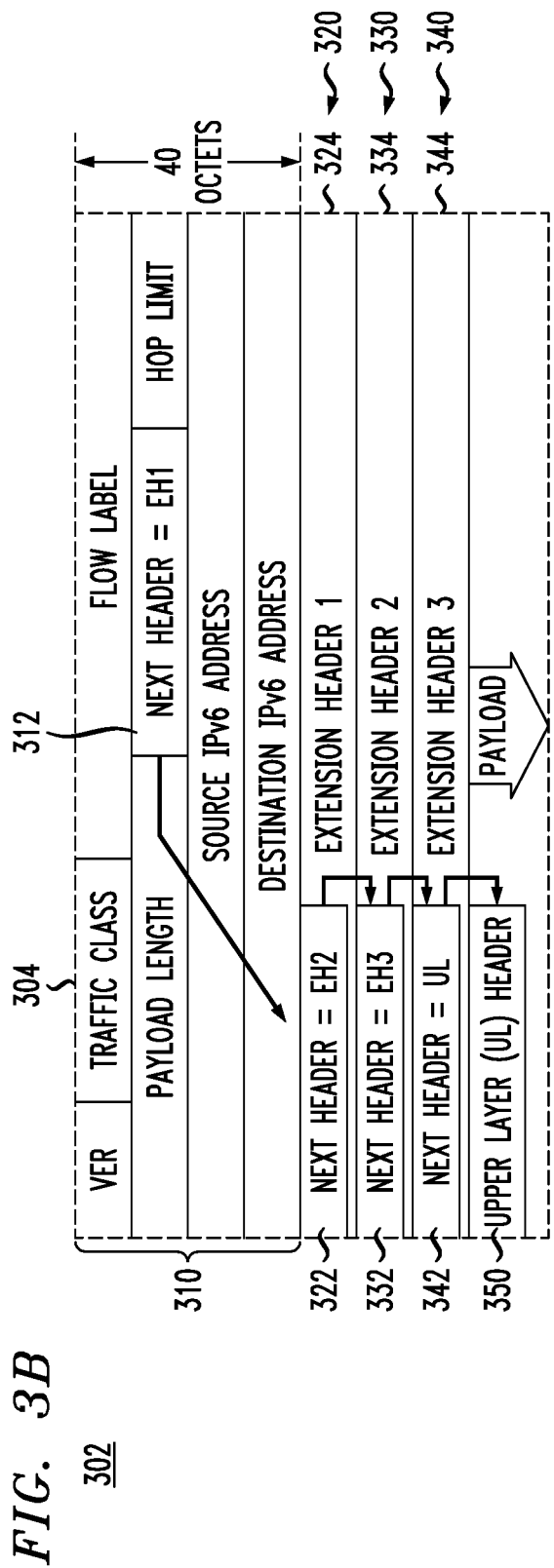

A main IPv6 header 310 is fixed in size at 40 bytes long, as indicated in both FIG. 3A and FIG. 3B. One or more customized IPv6 Extension Headers (EHs) can be added as needed, as illustrated by the example shown in FIG. 3B. Each EH starts with a 1-octet Next Header field, followed by an EH body. The format of the EH body depends on the EH type.

For example, to insert three extension headers 320, 330, and 340 into packet 300 (thereby generating packet 302, FIG. 3B), the pointer encoded into a Next Header field 312 of main header 310 is changed from UL (which points to an Upper Layer header 350 in FIG. 3A) to EH1 (which points to an EH 320 in FIG. 3B). EH 320 comprises a Next Header field 322 and an EH body 324. The Next Header field 322 is encoded with a pointer EH2, which points to an EH 330. EH 330 comprises a Next Header field 332 and an EH body 334. The Next Header field 332 is encoded with a pointer EH3, which points to an EH 340. EH 340 comprises a Next Header field 342 and an EH body 344. The Next Header field 342 is encoded with a pointer UL, which points to the above-mentioned Upper Layer header 350. In this manner, different numbers of EHs can be chained together as needed. Conventionally, IPv6 EHs may be used to carry certain provisions for timestamps, security, and special routing.

Figure 3C:
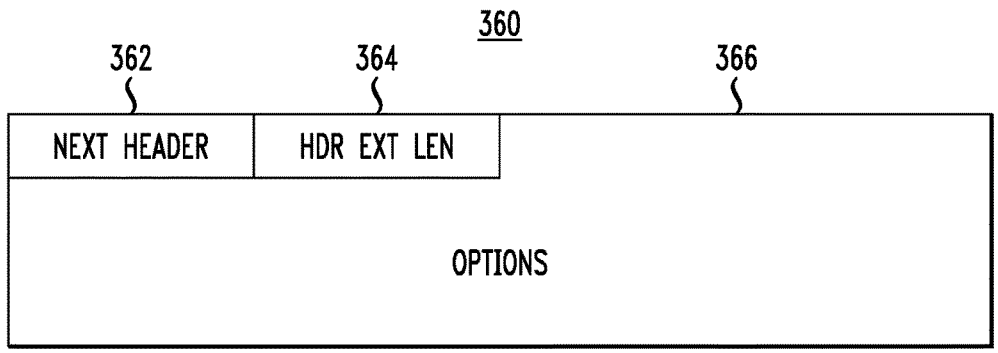

FIG. 3C schematically shows an EH 360 that may be used in data packet 302 (FIG. 3B) according to an embodiment. For example, EH 360 may preferably be used as EH 320, although other positions of EH 360 in the EH chain of packet 302 are also possible. EH 360 is a Hop-by-Hop Options Header, the general structure of which is defined in Section 4.3 of the above-cited RFC 2460. The Hop-by-Hop Options header can be used to carry optional information that is examined by every node along a packet's delivery path. The Hop-by-Hop Options header is identified by a Next Header value of 0 in the field 312 of header 310 (FIG. 3B). The Hop-by-Hop Options Header is sufficiently generic and enables multiple options within it. This capability of the Hop-by-Hop Options Header is relied-upon in this embodiment.

EH 360 comprises a "Next Header" field 362, a "Hdr Ext Len" field 364, and an "Options" field 366. The field 362 is an 8-bit selector that identifies the type of the next EH that immediately follows EH 360 in the EH chain of packet 302. The field 364 carries an 8-bit unsigned integer that specifies the length of EH 360 in 8-octet units, not including the first 8 octets. The field 366 is a variable-length field, whose length is constrained by the condition that the total length of EH 360 is an integer multiple of 8 octets.

Figure 3D:
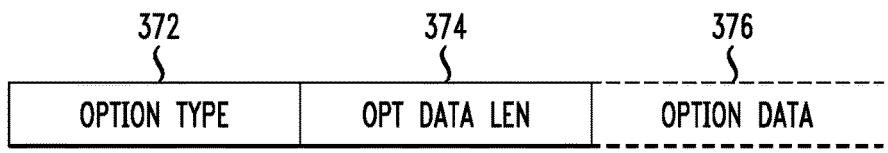

FIG. 3D schematically shows generic TLV encoding of the "Options" field 366, as defined in the above-cited RFC 2460. The "Options" field 366 comprises an "Option Type" sub-field 372, an "Opt Data Len" sub-field 374, and an "Option Data" sub-field 376. The sub-field 372 is an 8-bit identifier of the type of option. The sub-field 374 carries an 8-bit unsigned integer that specifies the length of the sub-field 376 in octets. The sub-field 376 is a variable-length field containing Option-Type-specific data.

The Option Type identifiers of sub-field 372 are encoded such that their highest-order two bits specify the action to be taken if the processing IPv6 node does not recognize the Option Type. For example, the following correspondence between the binary values of the first two bits of sub-field 372 and the actions may be realized:
- 00: skip over this option and continue processing the header;
- 01: discard the packet;
- 10: discard the packet and, regardless of whether or not the packet's Destination Address is a multicast address, send an ICMP Parameter Problem, Code 2, message to the packet's Source Address, pointing to the unrecognized Option Type;
- 11: discard the packet and, only if the packet's Destination Address is not a multicast address, send an ICMP Parameter Problem, Code 2, message to the packet's Source Address, pointing to the unrecognized Option Type.

The third-highest-order bit of sub-field 372 specifies whether or not the Option Data encoded in the sub-field 376 of that option can change en-route to the packet's final destination. When an Authentication header (another type of EH that carries authentication digest of the packet) is present in the packet, for any option whose data may change en-route, its entire sub-field 376 is to be treated as zero-valued octets when computing or verifying the packet's authenticating digest. The binary 0 encoded in the third bit of sub-field 372 is interpreted as "sub-field 376 does not change en-route." The binary 1 encoded in the third bit of sub-field 372 is interpreted as "sub-field 376 may change en-route."

The three high-order bits of sub-field 372 described above are treated as part of the full Option-Type value, not independent of the Option-Type value. That is, a particular option is identified by a full 8-bit Option-Type value, and not only by the low-order 5 bits thereof.

Figure 3E:
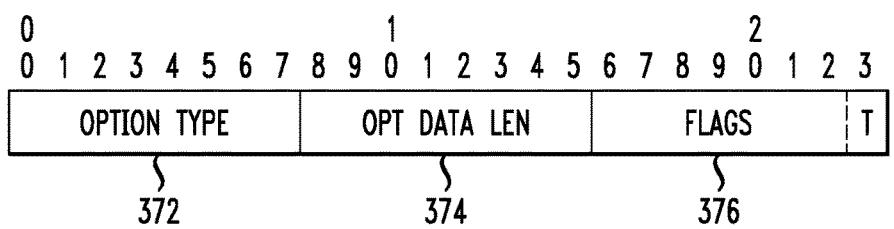

FIG. 3E schematically shows TLV encoding of the "Options" field 366 according to an embodiment. More specifically, the TLV shown in FIG. 3E defines a novel Option Type for the Hop-by-Hop Options Header, i.e., the TCI option.

The highest-order two bits of the sub-field 372 of the TCI option 366 are encoded with the binary 00. Accordingly, if a receiver does not recognize the TCI option 366, then the receiver operates to ignore the TCI option. The third-highest-order bit of sub-field 372 of the TCI option 366 is encoded with the binary 0. Accordingly, the sub-field 376 cannot change en-route. The remaining five bits of the sub-field 376 are assigned the binary value of 10010. As a result, the full binary value of the sub-field 372 is 00010010.

The sub-field 374 of the TCI option 366 is encoded with the binary 1.

The sub-field 376 of the TCI option 366 is 8-bit long and is encoded in the same manner as the "Flags" field 226, which is described above in reference to FIG. 2B.

Referring back to FIG. 3B, if EH 360 carrying the TCI option 366 is at position 320, then one of EH 330 and EH 340 may be a routing header carrying a SID stack for SR, constructed as described above.

When a packet router routes an IPv6 packet, the router may operate to check whether or not the TCI option 366 is present. If the TCI option 366 is present, then the router further operates to distinguish TE and non-TE packets based on the T-value carried by the LSB in the "Flags" sub-field 376 of the TCI option 366.

Figure 4:
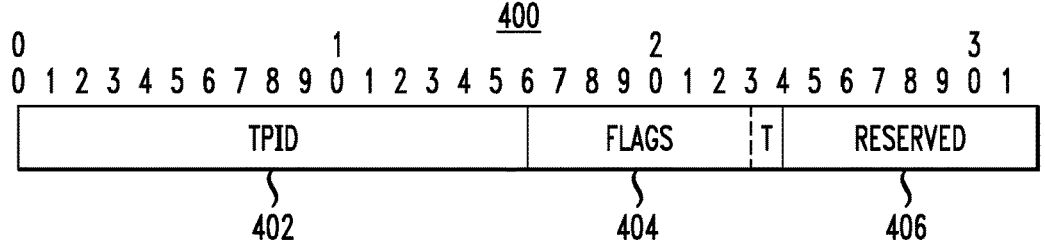
FIG. 4 schematically shows a TCI tag that may be used in an Ethernet network of FIG. 1 according to an embodiment.

FIG. 4 schematically shows a TCI tag 400 that may be used in an Ethernet network 100 according to an embodiment. TCI tag 400 comprises a "Tag Protocol Identifier" (TPID) field 402, a "Flags" field 404, and a "Reserved" field 406.

The TPID field 402 is a 16-bit field encoded with a value intended to identify the corresponding packet as carrying the TCI. The TPID field 402 can be placed, e.g., at the same position as the EtherType field of an untagged Ethernet frame (also see FIGS. 5-6). In an example implementation, the TPID field 402 can carry the hexadecimal value of 0xB000. This hexadecimal value is currently available for assignment (see, e.g., the IEEE 802 Numbers registry of Internet Assigned Numbers Authority, IANA). In alternative implementations, other available values may alternatively be assigned for use in the TPID field 402 of TCI tag 400.

The "Flags" field 404 is 8-bit long and is encoded in the same manner as the "Flags" field 226, which is described above in reference to FIG. 2B.

The "Reserved" field 406 is a 1-octet field, the value of which can be set to 0 by the sender and then ignored by the receiver.

Figure 5:
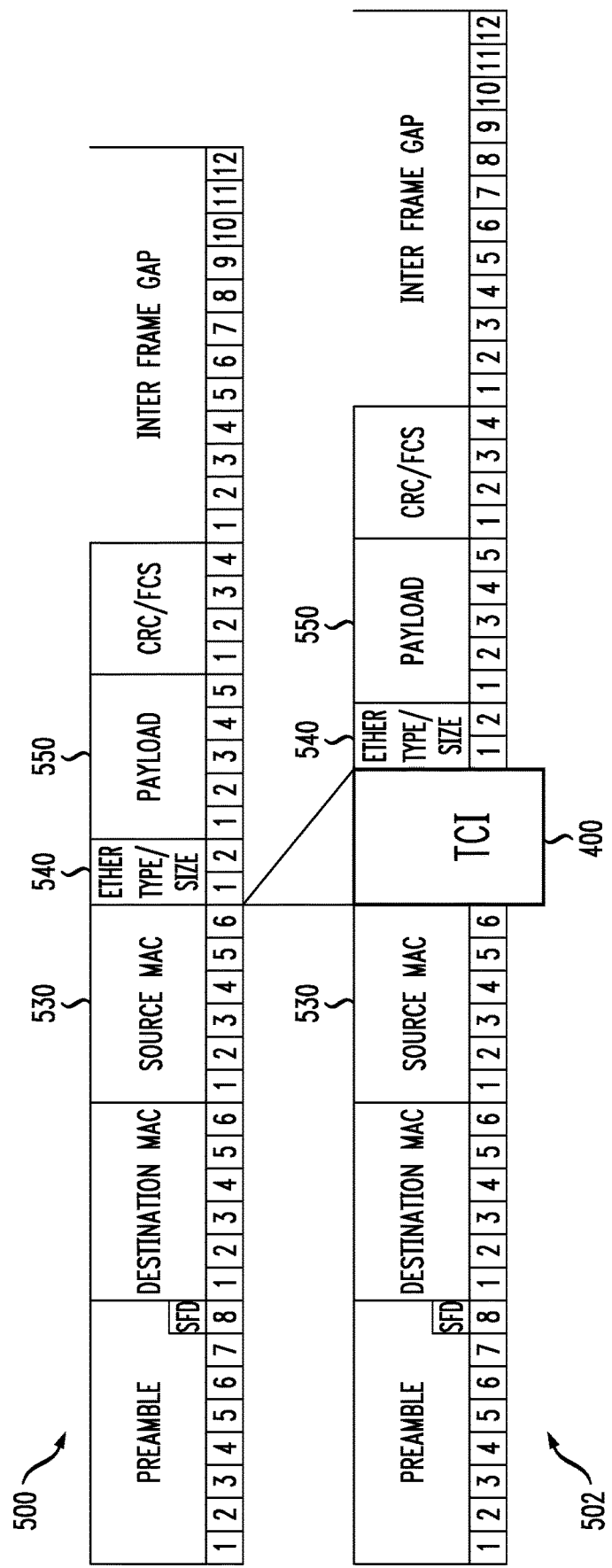
FIG. 5 pictorially illustrates insertion of the TCI tag of FIG. 4 into an untagged Ethernet packet according to an embodiment.
Figure 6:
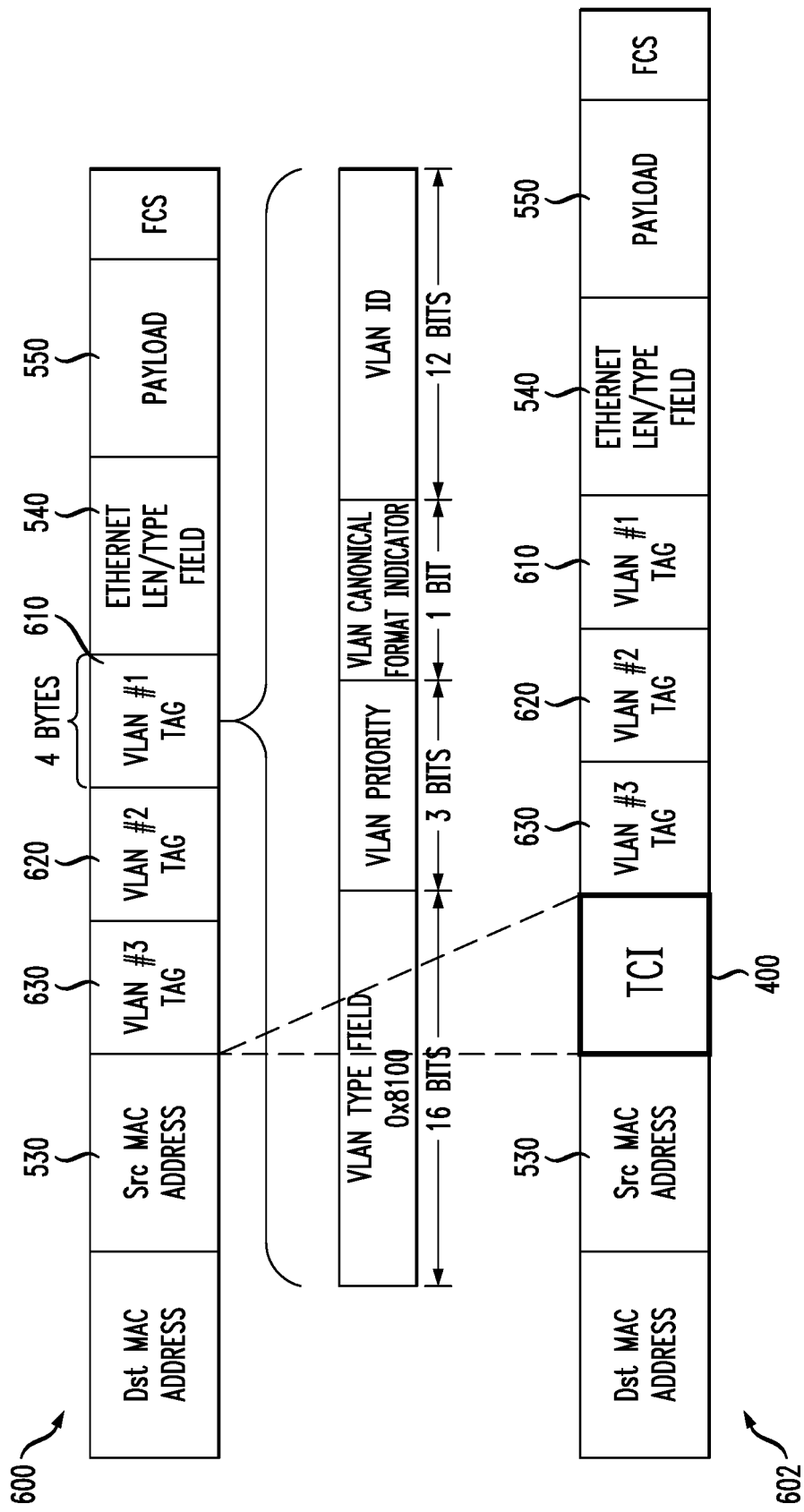
FIG. 6 pictorially illustrates insertion of the TCI tag of FIG. 4 into a tagged Ethernet packet according to an embodiment.

FIGS. 5-6 pictorially illustrate insertion of TCI tag 400 into an untagged Ethernet packet 500 and a tagged Ethernet packet 600, respectively, according to example embodiments. In alternative embodiments, other positions for the insertion of TCI tag 400 may also be used.

Referring to FIG. 5, the initial untagged Ethernet packet 500 is shown in the top row. After the insertion of TCI tag 400, packet 500 becomes a modified Ethernet packet 502, wherein the TCI tag is located between a Source MAC Address field 530 and an EtherType field 540. As such, TCI tag 400 occupies the space of a conventional (optional) IEEE 802.1Q or IEEE 802.1ad tag. Due to this location, the TPID field 402 (see FIG. 4) doubles as an EtherType field that, if appropriately encoded, signals the presence of TCI in the corresponding Ethernet header. The EtherType field 540, which signals the payload type of the Ethernet packet, is located in packet 502 between the TCI tag 400 and a Payload 550.

Referring to FIG. 6, the initial Ethernet packet 600 is shown in the top row. After the insertion of TCI tag 400, packet 600 becomes a modified Ethernet packet 602, wherein the TCI tag is located between Source MAC Address field 530 and a VLAN Tag field 630. For illustration purposes and without any implied limitations, each of packets 600 and 602 is shown as having three VLAN Tag fields (indicating the use of VLAN stacking), labeled 610, 620, and 630, respectively. An expanded view of an example structure of the VLAN Tag field 610 is also shown in FIG. 6. Each of the VLAN Tag fields 620 and 630 may have a similar structure.

As illustrated in FIG. 6, TCI tag 400 is preferably inserted after the Ethernet header (also see FIG. 5). If any other Ethernet-layer-specific headers were present after the Ethernet header, then those headers would have been appended to TCI tag 400. For example, in FIG. 6, the VLAN stack 610/620/630 is positioned after TCI tag 400. Since the TPID field 402 of TCI tag 400 (also see FIG. 5) takes the position of an EtherType field, a processing bridge can deduce from the value encoded therein that a VLAN header is also present. When TCI tag 400 is present, the processing bridge will also look at the EtherType field 540 to determine whether or not other Ethernet-specific headers are present.

When a bridge routes an Ethernet packet, the bridge may operate to check whether or not the TCI tag 400 is present. If the TCI tag 400 is present, then the bridge further operates to distinguish TE and non-TE packets based on the T-value carried by the LSB in the "Flags" sub-field 404 of the TCI tag 400.

Figure 7:
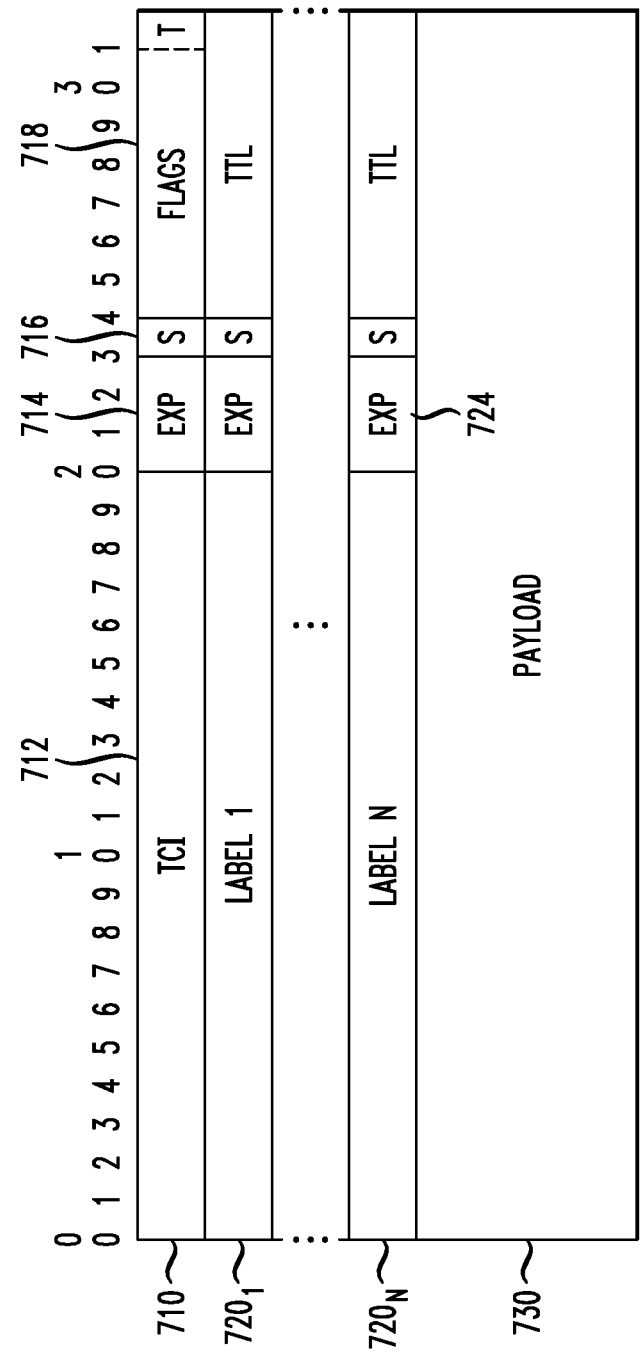
FIG. 7 schematically shows a data packet that may be transmitted in an MPLS network of FIG. 1 according to an embodiment.

FIG. 7 schematically shows a data packet 700 that may be transmitted in an MPLS network 100 according to an embodiment. Packet 700 comprises a TCI label 710, SR labels $720_1$-$720_N$, and a payload 730. SR labels $720_1$-$720_N$ are conventional MPLS labels that represent the source route for packet 700 through network 100. TCI label 710 is placed on top of the SR stack $720_1$-$720_N$, as indicated in FIG. 7.

A conventional MPLS label has the following fields:
(i) a 20-bit "Label" field;
(ii) a 3-bit TC field for QoS priority and ECN. In the pertinent literature, this field may sometimes be referred to as the EXP field. The latter notation is used in FIG. 7;
(iii) a 1-bit bottom of stack flag S. S=1 signifies that the current label is the last in the corresponding stack; and
(iv) an 8-bit time-to-live (TTL) field.

In an example embodiment, TCI label 710 is a special label used for the purpose outlined herein. Preferably, TCI label 710 is not used for any other purposes. TCI label 710 has the same general format as the conventional MPLS label, but with some of the fields being repurposed for TCI purposes. For example, a TCI field 712 of TCI label 710 generally corresponds to the conventional "Label" field. However, the value encoded in the TCI field 712 is unique to TCI and can be reserved for this specific use in the corresponding IANA registry of special-purpose labels. An EXP field 714 of TCI label 710 generally corresponds to the conventional TC (or EXP) field. The value encoded in the EXP field 714 is 0. As a result, a receiving router may ignore this field. Instead, the sending and receiving routers proceed to use the EXP field of the next label in the stack, e.g., of $720_1$ in the example of FIG. 7, for mapping the packet to the appropriate forwarding class. The S-bit 716 of TCI label 710 is set to 0 because the SR label stack $720_1$-$720_N$ follows, i.e., TCI label 710 is not the last in the stack. Format-wise, a "Flags" field 718 of TCI label 710 corresponds to the conventional TTL field. However, in TCI label 710, this field is repurposed as the Flags field and is not interpreted as providing the TTL value. In an example embodiment, "Flags" field 718 has the same structure as the "Flags" sub-field 404 (FIG. 4). The T-bit value T=1 in the field 718 indicates that packet 700 belongs to TE traffic. The T-bit value T=0 in the field 718 indicates that packet 700 belongs to non-TE traffic. Based on the T-bit value, the corresponding MPLS router operates to distinguish TE and non-TE packets 700.

Figure 8:
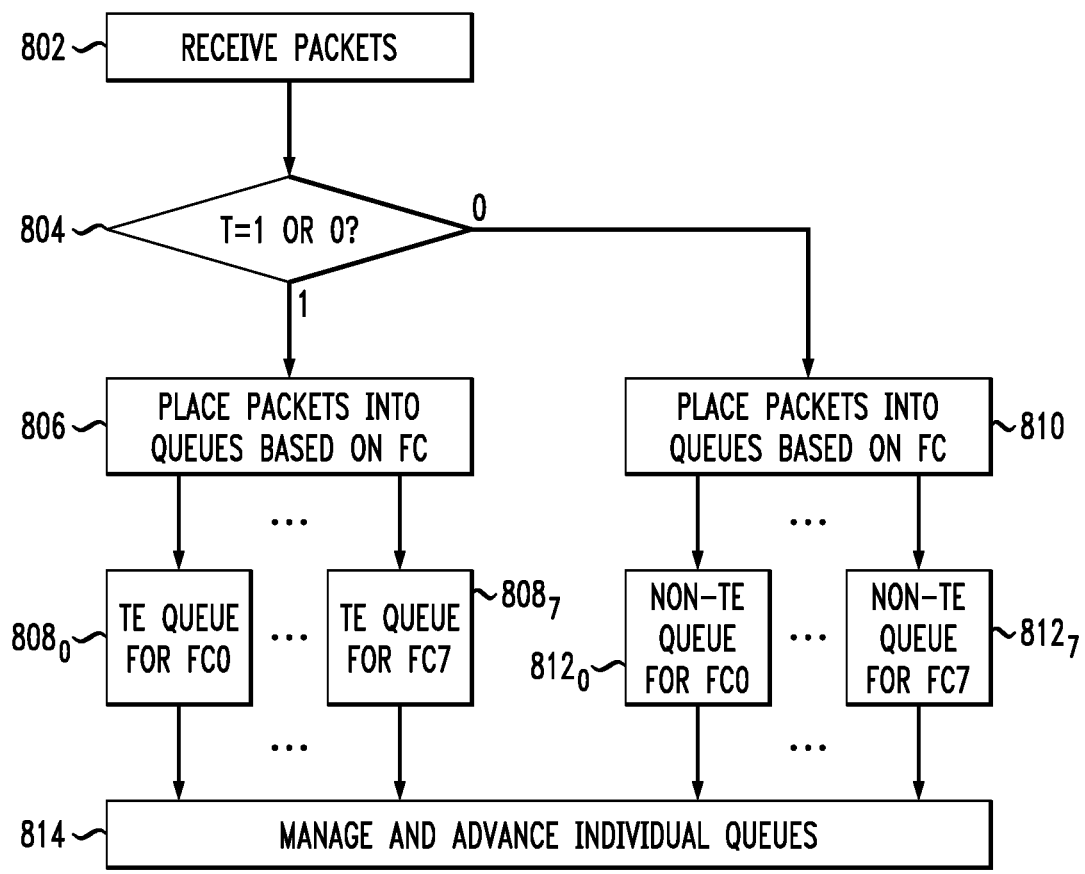
FIG. 8 shows a flowchart of a packet-processing method that can be implemented at a node of the network of FIG. 1 according to an embodiment.

FIG. 8 shows a flowchart of a packet-processing method 800 that can be implemented at a node Rn of network 100 according to an embodiment. Method 800 relies both on the above-described TCI and on the conventional traffic classification, which is based on FCs. The above-described FIGS. 2-7 provide examples of TCI encoding into packet headers for different packet-switching technologies. An FC can be encoded into packet headers corresponding to different packet-switching technologies, for example, as follows: (i) in the DSCP/ToS field of an IPv4 header, e.g., 204, FIG. 2A; (ii) in the Traffic Class field of an IPv6 header, e.g., 304, FIGS. 3A-3B; (iii) in the Priority Code Point (PCP) and Drop Eligible Indicator (DEI) fields of an IEEE 802.1Q tag, which is used in some Ethernet headers; and (iv) in the Traffic Class or EXP field of an MPLS header, e.g., 724, FIG. 7.

Some embodiments may use eight standardized FCs, e.g., numbered 0 to 7. Four of such FCs (i.e., EF, AF, BE, and NC, typically numbered as 0 to 3, respectively) have already been described above in reference to FIG. 1 and the DS-TE paradigm. FCs 4 to 7 may not typically have default assignments and may be customized as needed to meet the specific objectives of a particular network operator.

In an example embodiment, the traffic category indicated by the TCI is a dimension above the FC-classification dimension. As a result, for each TCI value, there can be a respective set of packet queues, with each of such sets comprising different packet queues for different FCs, e.g., as described in more detail below (see, $808_0$-$808_7$ and $812_0$-$812_7$, FIG. 8). Different embodiments of method 800 may be constructed for different packet-switching technologies to accommodate the above-indicated differences in the implementation of the TCI and FC dimensions.

At step 802 of method 800, node Rn operates to receive a data packet.

At step 804, node Rn operates to direct the packet received at step 802 through one of two different processing paths based on the TCI value (e.g., T; see 226, FIG. 2B; 376, FIG. 3E; 404, FIG. 4; 718, FIG. 7) encoded in the packets header. If T=1, then the packet is directed through a TE processing path 806-808. If T=0, then the packet is directed through a non-TE processing path 810-812.

At step 806, node Rn operates to place the step 804 directed data packet into one of TE queues $808_0$-$808_7$, with the placement being performed based on the FC encoded in the packet's header. For example, if the packet belongs to FC0, then the packet is placed into TE queue $808_0$, and so on. If the packet belongs to FC7, then the packet is placed into TE queue $808_7$.

In general, the total number Q of TE queues 808 depends on the number of FCs used in the corresponding network 100. In the embodiment illustrated in FIG. 8, the number Q is Q=8. In other embodiments, other values of Q may similarly be used.

At step 810, node Rn operates to place the step 804 directed data packet into one of non-TE queues $812_0$-$812_7$, with the placement being performed based on the FC encoded in the packet's header. For example, if the packet belongs to FC0, then the packet is placed into non-TE queue $812_0$, and so on. If the packet belongs to FC7, then the packet is placed into non-TE queue $812_7$. Herein, the total number of non-TE queues 812 is also Q=8, i.e., the same as the total number of TE queues 808.

At step 814, node Rn operates to manage and advance the queues $808_0$-$808_7$ and $812_0$-$812_7$ by dispatching the packets enqueued in individual queues based on the applicable allocation of resources, e.g., BW, and other pertinent policies.

The queues $808_0$-$808_7$ are managed and advanced based on the resources reserved in accordance with the applicable TE specification and further in accordance with the relative priorities of the corresponding FCs. Depending of the present conditions (e.g., traffic volume, resource oversubscription, fill and capacity of the queue, etc.), a packet identified as being intended for a queue $808_q$ (where q=0, 1, . . . , Q–1) may be transmitted through the corresponding link or dropped, e.g., as an outcome of the application of one of methods 1100, FIG. 11; 1200, FIG. 12; and 1300, FIG. 13.

The queues $812_0$-$812_7$ are managed and advanced based on the unreserved resources and in accordance with the relative priorities of the corresponding FCs. Depending of the present conditions, a packet identified as being intended for a queue $812_q$ may be transmitted through the corresponding link or dropped, e.g., as an outcome of the application of one of methods 1100, FIG. 11; 1200, FIG. 12; and 1300, FIG. 13.

Figure 9:
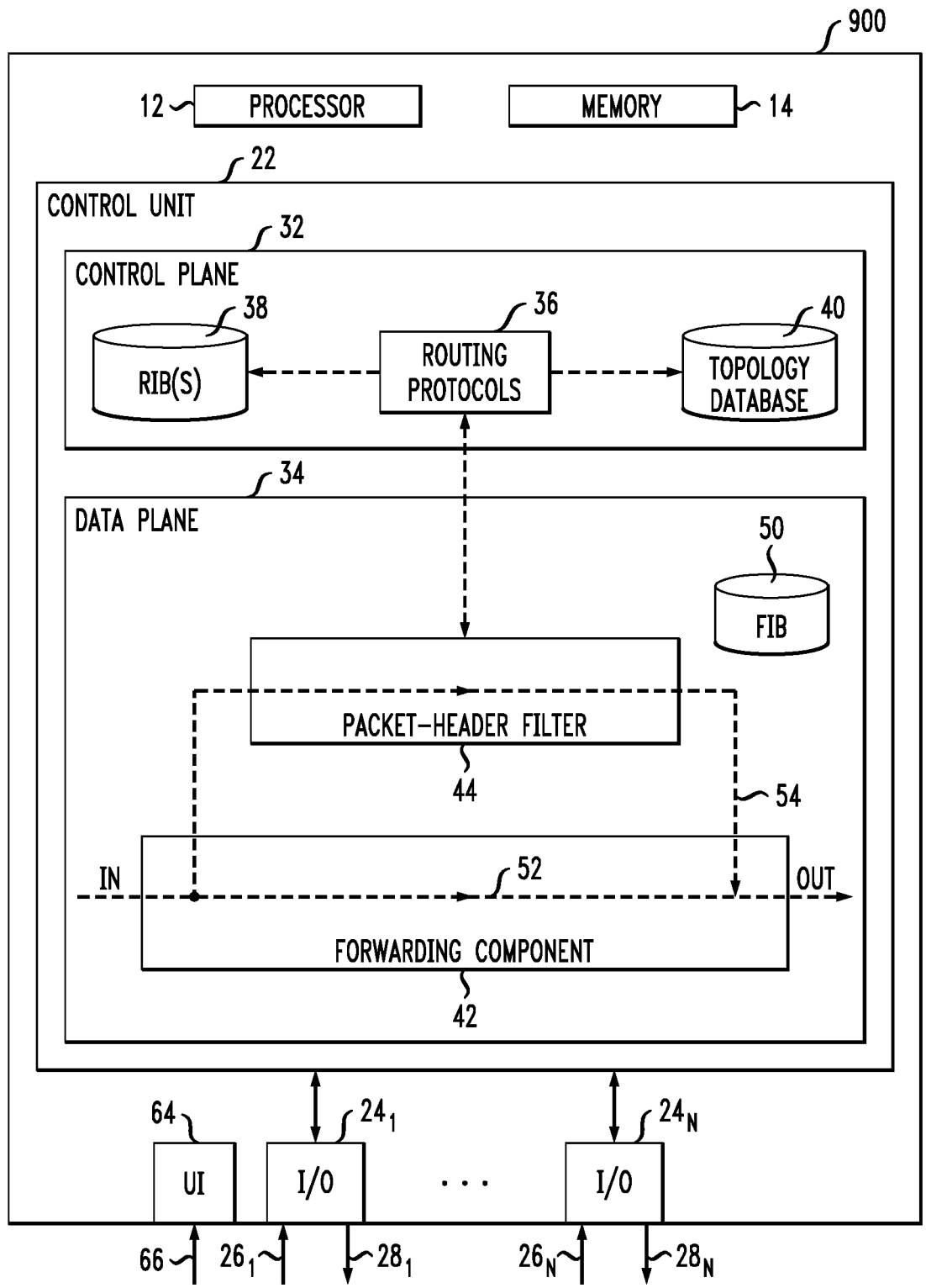
FIG. 9 shows a block diagram of a network device using which various disclosed embodiments may be practiced.

FIG. 9 shows a block diagram of a network device 900 using which various embodiments may be practiced. As shown, network device 900 comprises a processor 12, a memory 14, a control unit 22, input/output (I/O) ports $24_1$-$24_N$, and an optional user interface (UI) 64, where N is an integer greater than one. Processor 12 may be configured to carry out data/signal processing and/or execute instructions to support proper operation of other components of network device 900. Memory 14 may be configured to store therein the program code and configuration data needed for proper support and execution of various functions of network device 900.

In an example embodiment, network device 900 may include a chassis or cabinet (not explicitly shown in FIG. 9) having a plurality of slots configured to house certain components of the network device, e.g., implemented in the form of insertable blades or cards, including, for example, the I/O ports $24_1$-$24_N$. The chassis typically provides communicable coupling of the inserted blades and/or cards to control unit 22 via a bus, a backplane, and/or other suitable communication mechanism. In operation, the I/O ports $24_1$-$24_N$ may receive packets and/or other network traffic via ingress network links $26_1$-$26_N$, respectively, and may send packets and/or other network traffic via egress network links $28_1$-$28_N$, respectively. In some embodiments, a pair of links $26_n$ and $28_n$ (where n=1, N) may be implemented using a common physical communication medium capable of supporting a full duplex mode of operation. In some embodiments, each of the I/O ports $24_1$-$24_N$ may be capable of sending and receiving data signals at the same time.

In an example embodiment, control unit 22 may be partitioned into logical and/or physical planes, each implementing a respective distinct functionality. As illustratively shown in FIG. 9, control unit 22 comprises a control plane 32 and a data or forwarding plane 34. Control unit 22 may further comprise a service plane (not explicitly shown in FIG. 9) and possibly some other logical or physical planes. In some embodiments, some or all of such planes may be implemented using different respective software pieces running on a shared set of hardware components, e.g., including processor 12 and memory 14. In some other embodiments, some or all of such planes may be implemented using different respective hardware components (e.g., digital circuits). In yet some other embodiments, some or all of such planes may be implemented using some suitable combinations of dynamically programmable and one-time programmable (e.g., static) digital circuits.

In an example embodiment, control plane 32 operates to provide a routing functionality for network device 900. For example, control plane 32 may be configured to implement one or more routing protocols 36, which can be called upon as appropriate or necessary. Such routing protocols may include, for example, the Routing Information Protocol (RIP), the BGP protocol, and/or other suitable routing protocols. Control plane 32 also typically has one or more routing information bases (RIBs) 38 and a topology database 40 configured to store relevant routing and topology information therein. Control plane 32 may use the information stored in the RIB(s) 38 and topology database 40 to select or determine one or more routes through network 100 for packets that are being processed by network device 900.

Control plane 32 may further operate to update a forwarding information base (FIB) 50 of data plane 34 in accordance with the pertinent routing protocol(s) 36 and information stored in the RIB(s) 38 and topology database 40. When forwarding a packet, data plane 34 may generally rely on the packet's header and information from the FIB 50 to determine a next hop for the packet. Data plane 34 may then identify a subset of egress network links $28_1$-$28_N$ that the packet may be applied to.

In an example embodiment, data plane 34 comprises a forwarding component 42 and a packet-header filter 44. Forwarding component 42 and packet-header filter 44 can be implemented, e.g., using a packet processor, a packet-forwarding engine, or other suitable execution unit that operates to execute actions on the received packets. Packet-header filter 44 operates to determine which action(s) is/are to be applied to a packet based on its data-plane header and optionally by accessing a corresponding flow cache (not explicitly shown in FIG. 9) and, if necessary, memory 14. A dashed arrow 54 schematically indicates a processing path invoked by data plane 34 in the process of determining a set of actions applicable to a packet 52 temporarily stored in forwarding component 42. In an example embodiment, forwarding component 42 and packet-header filter 44 are configured to implement method 800 (FIG. 8).

In operation, network device 900 may receive packet 52 through one of ingress network links $28_1$-$28_N$. Forwarding component 42 typically has a memory buffer (not explicitly shown in FIG. 9, see FIG. 10) in which packet 52 can be temporarily stored. The memory buffer may be programmed to implement queues $808_0$-$808_7$ and $812_0$-$812_7$ (not explicitly shown in FIG. 9, see FIGS. 8, 10). Actions that the forwarding component 42 may apply to the stored packet 52 can be selected, e.g., from the following nonexclusive list: (i) place packet 52 into one of queues $808_0$-$808_7$ and $812_0$-$812_7$ based on the packet-header processing performed by packet-header filter 44; (ii) forward packet 52 to one or more I/O ports 24 for transmission on the corresponding one or more links 28; (iii) drop packet 52; (iv) add a tag to packet 52; (v) send packet 52 to another module within network device 900, e.g., to the connection tracker module, etc.

In some embodiments, network device 900 may receive configuration information 66 through UI 64, e.g., from a system administrator. UI 64 can be implemented, e.g., as a command line interface.

Figure 10:
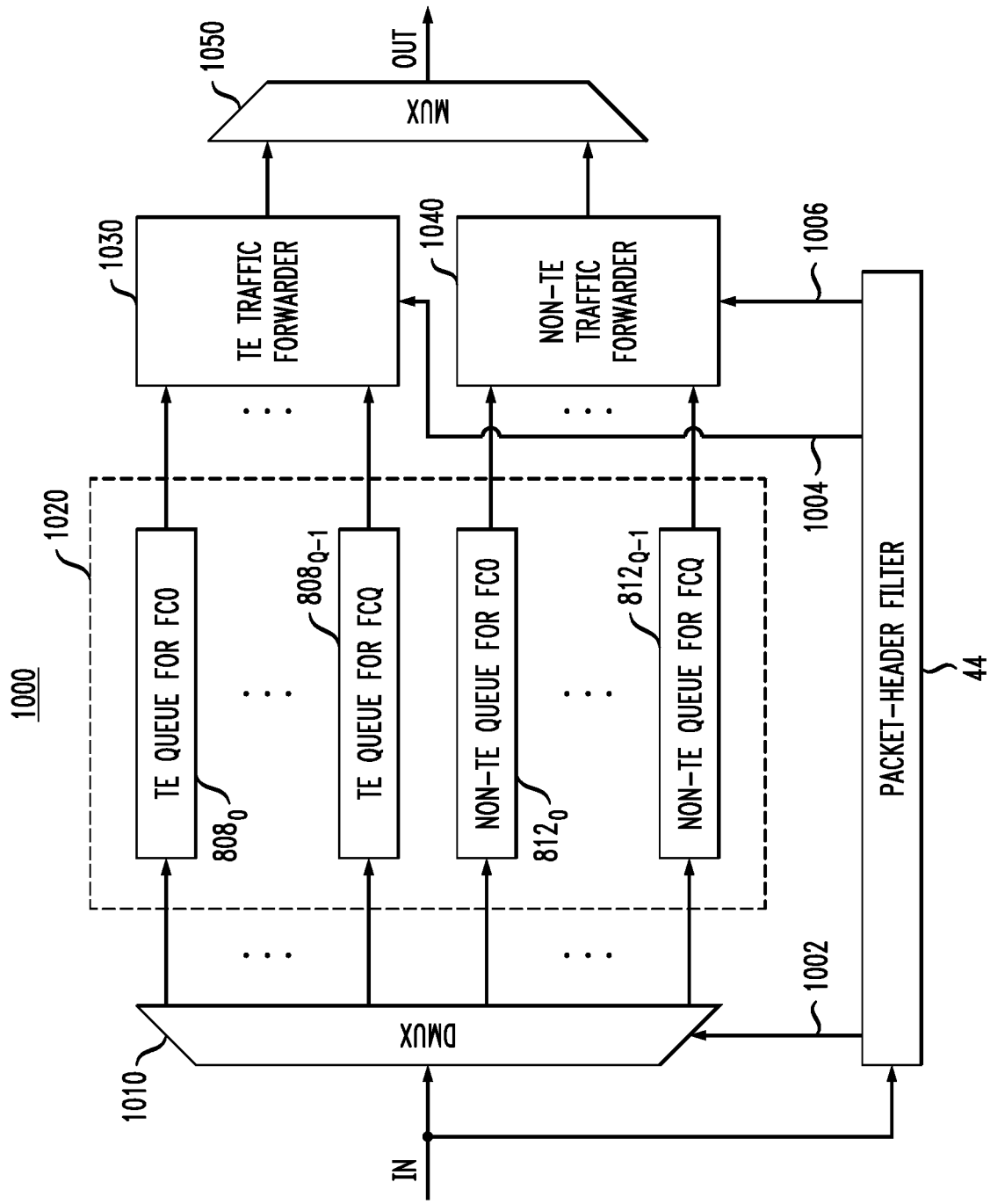
FIG. 10 shows a block diagram of a packet-forwarding engine that can be used in the network device of FIG. 9 according to an embodiment.

FIG. 10 shows a block diagram of a packet-forwarding engine 1000 that can be used in network device 900 (FIG. 9) according to an embodiment. Engine 1000 comprises packet-header filter 44 (also see FIG. 9), which is configured to generate control signals 1002, 1004, and 1006 applied to a demultiplexer (DMUX) 1010, a TE traffic forwarder 1030, and a non-TE traffic forwarder 1040, respectively. Engine 1000 further comprises a memory buffer 1020 and a multiplexer (MUX) 1050. Memory buffer 1020 is configured to implement queues $808_0$-$808_{Q-1}$ and $812_0$-$812_{Q-1}$. MUX 1050 is configured to appropriately multiplex the respective outputs of traffic forwarders 1030 and 1040 for application to a respective one of the I/O ports $24_1$-$24_N$ (also see FIG. 9), which then transmits the applied packets on the corresponding link.

In operation, packet-header filter 44 generates control signal 1002 by appropriately parsing and processing packet headers to cause DMUX 1010 to implement steps 806 and 810 of method 800 (FIG. 8). Traffic forwarders 1030 and 1040 and MUX 1050 are configured to implement step 814 of method 800 (FIG. 8). As already indicated above, some packets may be dropped without being directed to MUX 1050.

Packet-header filter 44 may generate control signals 1004 and 1006 to configure traffic forwarders 1030 and 1040, when appropriate or necessary, to modify the packet headers of the packets retrieved from the queues $808_0$-$808_{Q-1}$ and $812_0$-$812_{Q-1}$ prior to applying the retrieved packets to MUX 1050. For example, in some embodiments, control signal 1004 may be used to cause TE traffic forwarder 1030 to remove the topmost SID of the SR SID stack from the packet header. A person of ordinary skill in the pertinent art will readily recognize other pertinent packet-header modifications that can be caused by control signals 1004 and 1006.

Figure 11:
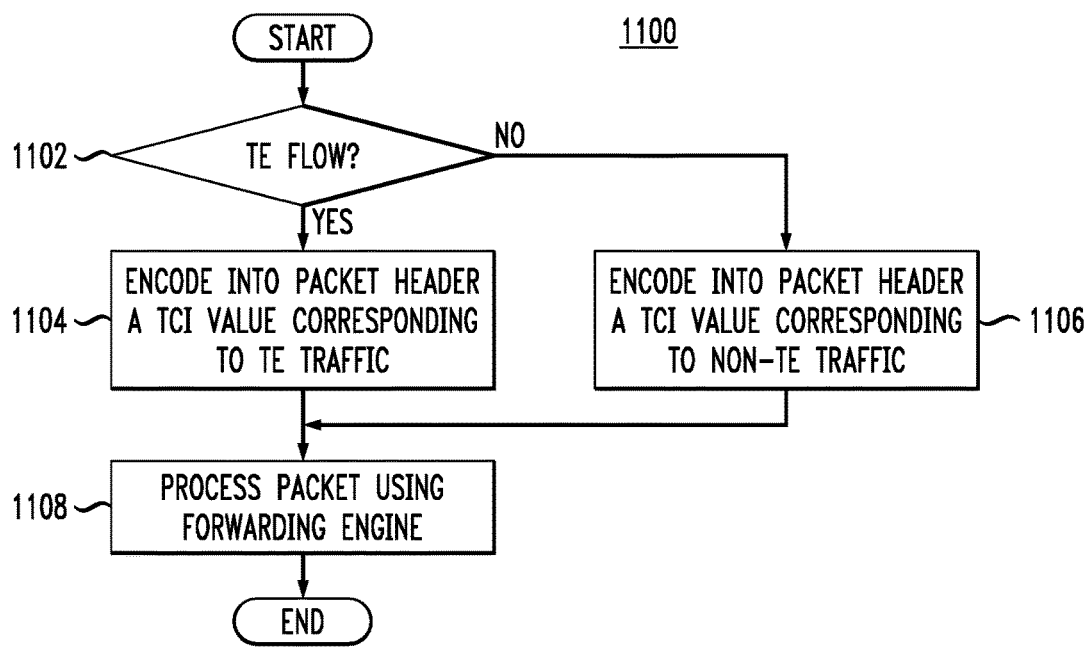
FIG. 11 shows a flowchart of a packet-processing method that can be implemented at a node of the network of FIG. 1 according to another embodiment.

FIG. 11 shows a flowchart of a packet-processing method 1100 that can be implemented at a node of network 100 (FIG. 1) according to another embodiment. More specifically, method 1100 can be executed by an ingress node, such as node R1 in the example shown in FIG. 1. Method 1100 can be implemented, e.g., using network device 900 (FIG. 9) and/or packet-forwarding engine 1000 (FIG. 10). The inputs to method 1100 include: (i) a data packet encoded with a source route; (ii) an indication of whether or not the data packet belongs to a TE flow; and (iii) identification of the next-hop link for the data packet.

Method 1100 begins at step 1102, whereat network device 900 checks the corresponding input parameter to determine whether or not the data packet belongs to a TE flow. If it is determined that the packet belongs to a TE flow, then the processing of method 1100 is directed to step 1104. Otherwise, the processing of method 1100 is directed to step 1106.

At step 1104, network device 900 operates to encode into the packet header a TCI value corresponding to TE traffic, e.g., T=1 (see 226, FIG. 2B; 376, FIG. 3E; 404, FIG. 4; 718, FIG. 7).

At step 1106, network device 900 operates to encode into the packet header a TCI value corresponding to non-TE traffic, e.g., T=0 (see 226, FIG. 2B; 376, FIG. 3E; 404, FIG. 4; 718, FIG. 7).

Figure 12:
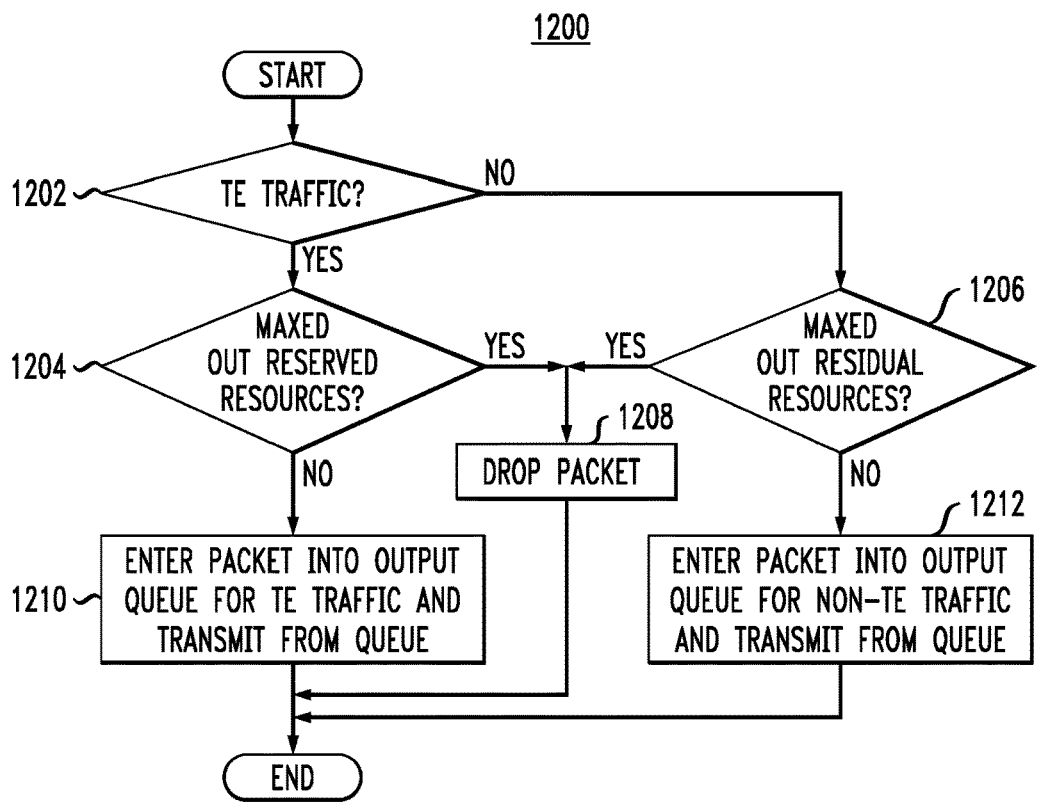
FIG. 12 shows a flowchart of a method of forwarding a TCI-encoded packet on a link of the network of FIG. 1 according to an embodiment.

At step 1108, network device 900 operates to direct the packet having the TCI encoded in the header thereof at step 1104 or step 1106 to the forwarding component 42 (FIG. 9) or forwarding engine 1000 (FIG. 10) for application to the link identified as the next-hop link for the data packet. The forwarding component 42 (FIG. 9) or forwarding engine 1000 (FIG. 10) then operates to process the packet, e.g., using a corresponding embodiment of method 800 (FIG. 8) or method 1200 (FIG. 12). The processing of method 1100 is then terminated.

Figure 13:
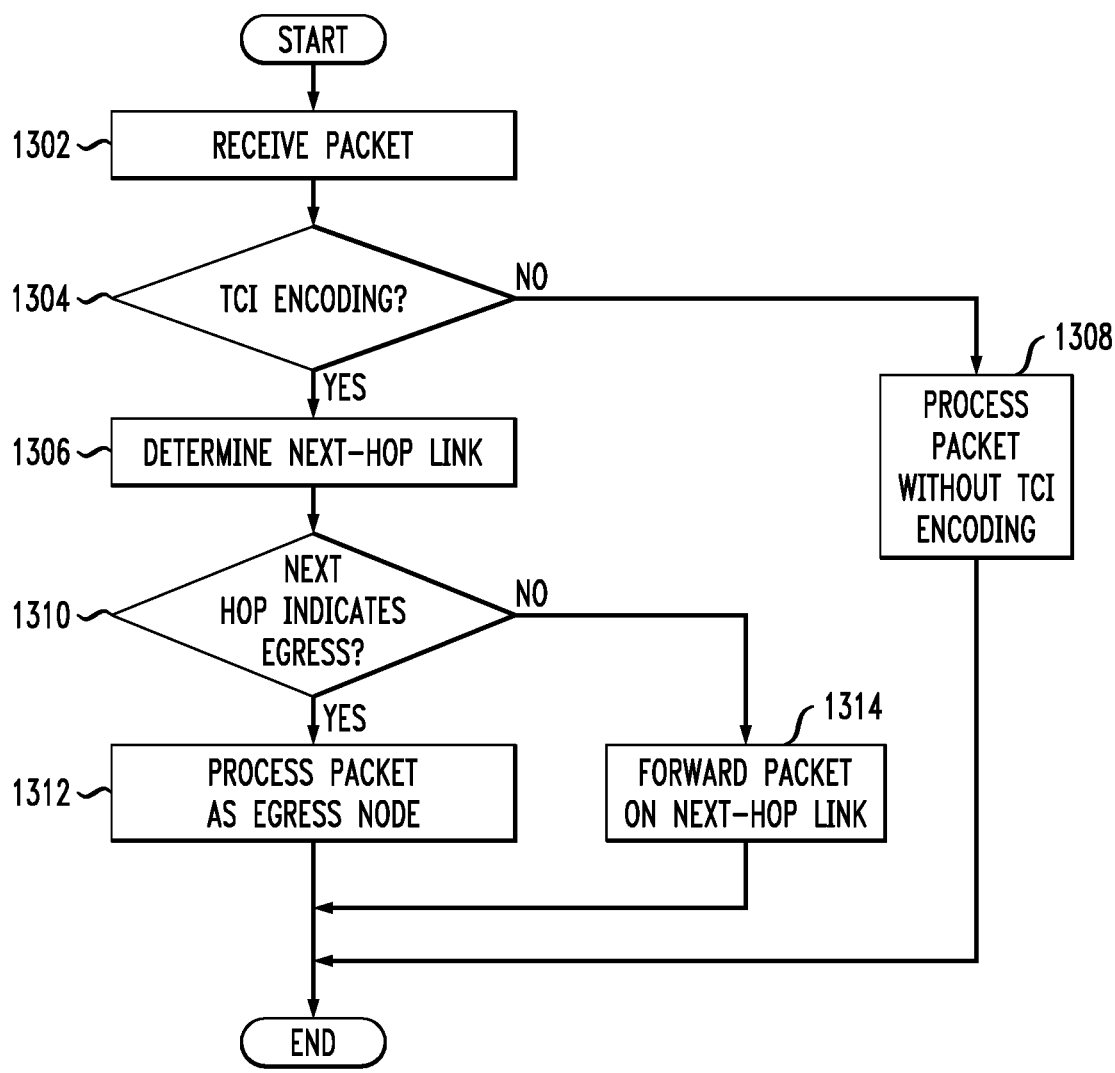
FIG. 13 shows a flowchart of a packet-processing method that can be implemented at a node of the network of FIG. 1 according to yet another embodiment.

FIG. 12 shows a flowchart of a method 1200 of forwarding a TCI-encoded packet on a link of network 100 (FIG. 1) according to an embodiment. As already indicated above, an embodiment of method 1200 can be used to implement at least some part of the processing of step 1108 of method 1100 (FIG. 11). Another embodiment of method 1200 can be used to implement at least some part of the processing of step 1314 of method 1300 (FIG. 13). The inputs to method 1200 include: (i) a data packet encoded with the TCI; and (ii) identification of the link on which to forward the packet.

Method 1200 begins at step 1202, whereat forwarding component 42 (FIG. 9) reads the TCI value (e.g., T; see 226, FIG. 2B; 376, FIG. 3E; 404, FIG. 4; 718, FIG. 7) encoded in the packet's header to determine whether the data packet belongs to TE traffic or non-TE traffic. If it is determined that the packet belongs to TE traffic (e.g., T=1), then the processing of method 1200 is directed to step 1204. Otherwise (e.g., T=0), the processing of method 1200 is directed to step 1206.

At step 1204, forwarding component 42 operates to determine whether or not the TE traffic egressing on the identified link has currently maxed out the corresponding reserved resources (e.g., reserved BW) for the TE traffic. If the reserved resources are currently maxed-out, then the processing of method 1200 is directed to step 1208. Otherwise, the processing of method 1200 is directed to step 1210.

At step 1206, forwarding component 42 operates to determine whether or not the non-TE traffic egressing on the identified link currently maxed out the corresponding resources (e.g., residual BW) assignable to the non-TE traffic. If the resources are currently maxed-out, then the processing of method 1200 is directed to step 1208. Otherwise, the processing of method 1200 is directed to step 1212.

At step 1208, forwarding component 42 operates to drop the packet. The processing of method 1200 is then terminated. As used herein, the term "drop" means: discard the packet without further transmission to the intended destination, e.g., on the corresponding communication link or through the corresponding local egress port.

At step 1210, forwarding component 42 operates to enqueue the packet into an appropriate one of the output queues for the TE traffic on the identified link. As already indicated above, in embodiments implementing DS-TE, there may be several output queues for such TE traffic (see, e.g., FIGS. 8 and 10). After being enqueued, the packet is eventually transmitted from the corresponding queue on the identified link in accordance with the applicable queue-management algorithm. The processing of method 1200 is then terminated.

At step 1212, forwarding component 42 operates to enqueue the packet into an appropriate one of the output queues for the non-TE traffic on the identified link. As already indicated above, in embodiments implementing DS-TE, there may be several output queues for such non-TE traffic (see, e.g., FIGS. 8 and 10). After being enqueued, the packet is eventually transmitted from the corresponding queue on the identified link in accordance with the applicable queue-management algorithm. The processing of method 1200 is then terminated.

FIG. 13 shows a flowchart of a packet-processing method 1300 that can be implemented at a node of network 100 (FIG. 1) according to yet another embodiment. More specifically, method 1300 can be executed either by a transit node, such as node R7 in the traffic example shown in FIG. 1, or by an egress node, such as node R8 in the traffic example shown in FIG. 1.

At step 1302 of method 1300, the corresponding node Rn receives a data packet.

At step 1304, packet-header filter 44 of the corresponding network device 900 checks whether or not the data packet has TCI encoding. If it is determined that there is TCI encoding in the packet header, then the processing of method 1300 is directed to step 1306. Otherwise, the processing of method 1300 is directed to step 1308.

At step 1306, packet-header filter 44 operates to determine the next-hop link for the packet using the source route (e.g., SID stack) encoded in the packet.

At step 1308, network device 900 operates to execute an appropriate (e.g., prior-art) packet-forwarding sequence that does not rely on or makes use of TCI encoding. The processing of method 1300 is then terminated.

At step 1310, network device 900 operates to determine whether or not the next-hop link indicates that the host node is the egress node for the packet. If it is determined that the host node is the egress node, then the processing of method 1300 is directed to step 1312. Otherwise, the processing of method 1300 is directed to step 1314.

At step 1312, network device 900 operates to process the packet in accordance with the egress-node designation. The processing of method 1300 is then terminated.

At step 1314, network device 900 operates to forward the packet on the next-hop link determined at step 1306. In an example embodiment, step 1314 may be implemented using method 1200 (FIG. 12). The processing of method 1300 is then terminated.

According to an example embodiment disclosed above, e.g., in the summary section and/or in reference to any one or any combination of some or all of FIGS. 1-13, provided is an apparatus, comprising a network device (e.g., 900, FIG. 9) that comprises packet-processing circuitry (e.g., 34, FIG. 9) capable of forwarding a packet in accordance with source routing encoded in the packet, the packet-processing circuitry configured to distinguish (e.g., at 1202, FIG. 12) packets belonging to a first traffic category (e.g., TE) and packets belonging to a second traffic category (e.g., non-TE) based on a category indicator (e.g., TCI) encoded in a packet header, the packets of the first traffic category being transmitted by the network device using a respective bandwidth reservation on a communication link thereof, the packets of the second traffic category being transmitted without a bandwidth reservation; and wherein the packet-processing circuitry is configured to implement a first queue (e.g., $808_q$, FIG. 10) for the packets of the first traffic category and a different second queue (e.g., $812_q$, FIG. 10) for the packets of the second traffic category, the first and second queues being connected (e.g., at 1050, FIG. 10) to feed enqueued packets into the communication link.

In some embodiments of the above apparatus, the apparatus is configured to make the respective bandwidth reservation to meet quality-of-service obligation with respect to one or more flows of packets of the first traffic category.

In some embodiments of any of the above apparatus, the network device is a part of a network node (e.g., R1, FIG. 1) configured to operate as an ingress node for at least one of the flows (e.g., flow A, FIG. 1).

In some embodiments of any of the above apparatus, the network device is a part of a network node (e.g., R7, FIG. 1) configured to operate as a transit node for at least one of the flows (e.g., flow A, FIG. 1).

In some embodiments of any of the above apparatus, the network device is a part of a network node (e.g., R8, FIG. 1) configured to operate as an egress node for at least one of the flows (e.g., flow A, FIG. 1).

In some embodiments of any of the above apparatus, the packet-processing circuitry is further configured to: implement a plurality of first queues (e.g., $808_0$-$808_{Q-1}$, FIG. 10) for the packets of the first traffic category; and enqueue the packets of the first traffic category (e.g., at 806, FIG. 8) into different ones of the first queues based on respective forwarding classes of the packets of the first traffic category.

In some embodiments of any of the above apparatus, the packet-processing circuitry is further configured to: implement a plurality of second queues (e.g., $812_0$-$812_{Q-1}$, FIG. 10) for the packets of the second traffic category; and enqueue the packets of the second traffic category (e.g., at 810, FIG. 8) into different ones of the second queues based on respective forwarding classes of the packets of the second traffic category.

In some embodiments of any of the above apparatus, the packet-processing circuitry is further configured to drop (e.g., at 1208, FIG. 12) a received packet of the first traffic category when transmission of said received packet on the communication link would cause an oversubscription, by the packets of the first traffic category, of the respective bandwidth reservation.

In some embodiments of any of the above apparatus, the packet-processing circuitry is further configured to drop (e.g., at 1208, FIG. 12) a received packet of the second traffic category when transmission of the received packet of the second traffic category on the communication link would cause a use of bandwidth by the packets of the second traffic category to exceed a difference between a total amount of bandwidth on the communication link and the respective bandwidth reservation.

In some embodiments of any of the above apparatus, the packet-processing circuitry is further configured to use different respective traffic metrics (e.g., 1204, 1206, FIG. 12) for the first and second traffic categories for a decision to drop a received packet.

In some embodiments of any of the above apparatus, the network device is a part of an Internet Protocol network.

In some embodiments of any of the above apparatus, the network device is a part of a local area network configured to transmit packets using an Ethernet technology.

In some embodiments of any of the above apparatus, the network device is a part of a Multiprotocol Label Switching network.

According to another example embodiment disclosed above, e.g., in the summary section and/or in reference to any one or any combination of some or all of FIGS. 1-13, provided is an apparatus, comprising a network device (e.g., 900, FIG. 9) that comprises: at least one processor (e.g., 12, FIG. 9); and at least one memory (e.g., 14, FIG. 9) including program code; and wherein the at least one memory and the program code are configured to, with the at least one processor, cause the network device at least to: encode source routing (e.g., $720_1$-$720_N$, FIG. 7) into a packet; and encode a category indicator (e.g., 710, FIG. 7) into a header of the packet for distinguishing (e.g., at 1202, FIG. 12) packets belonging to a first traffic category (e.g., TE) and packets belonging to a second traffic category (e.g., non-TE), the packets of the first traffic category being transmitted through a corresponding network using one or more bandwidth reservations on one or more respective communication links thereof, the packets of the second traffic category being transmitted through the corresponding network without a bandwidth reservation.

In some embodiments of the above apparatus, the at least one memory and the program code are configured to, with the at least one processor, implement a first queue (e.g., $808_q$, FIG. 10) for the packets of the first traffic category and a different second queue (e.g., $812_q$, FIG. 10) for the packets of the second traffic category, the first and second queues being connected (e.g., at 1050, FIG. 10) to feed enqueued packets to a corresponding one of the one or more respective communication links.

In some embodiments of any of the above apparatus, the at least one memory and the program code are further configured to, with the at least one processor: implement a plurality of first queues (e.g., $808_0$-$808_{Q-1}$, FIG. 10) for the packets of the first traffic category; and enqueue the packets of the first traffic category (e.g., at 806, FIG. 8) into different ones of the first queues based on respective forwarding classes of the packets of the first traffic category.

In some embodiments of any of the above apparatus, the at least one memory and the program code are further configured to, with the at least one processor: implement a plurality of second queues (e.g., $812_0$-$812_{Q-1}$, FIG. 10) for the packets of the second traffic category; and enqueue the packets of the second traffic category (e.g., at 810, FIG. 8) into different ones of the second queues based on respective forwarding classes of the packets of the second traffic category.

According to yet another example embodiment disclosed above, e.g., in the summary section and/or in reference to any one or any combination of some or all of FIGS. 1-13, provided is a non-transitory machine-readable medium, having encoded thereon program code, wherein, when the program code is executed by a machine, the machine implements a method comprising the steps of: encoding source routing (e.g., $720_1$-$720_N$, FIG. 7) into a packet; and encoding (e.g., at 1104, 1106, FIG. 11) a category indicator (e.g., 710, FIG. 7) into a header of the packet for distinguishing (e.g., at 1202, FIG. 12) packets belonging to a first traffic category (e.g., TE) and packets belonging to a second traffic category (e.g., non-TE), the packets of the first traffic category being transmitted through a corresponding network using one or more bandwidth reservations on one or more respective communication links thereof, the packets of the second traffic category being transmitted through the corresponding network without a bandwidth reservation.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the patented invention(s). Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing the patented invention(s). When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that at least some steps of the above-described methods can be performed by programmed computers and/or processors. Herein, some embodiments are intended to cover program storage devices, e.g., digital data storage media, which are machine or computer readable and encode machine-executable or computer-executable programs of instructions where said instructions perform some or all of the steps of methods described herein.

The description and drawings merely illustrate the principles of the disclosure. All examples recited herein are principally intended expressly to be only for pedagogical purposes to aid the reader in understanding the principles of the disclosure and the concepts contributed by the inventor (s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus, comprising a network device that comprises packet-processing circuitry capable of forwarding a packet in accordance with stateless source routing encoded in the packet, the packet-processing circuitry configured to distinguish packets belonging to a first traffic category and packets belonging to a second traffic category based on a category indicator encoded in a packet header, the packets of the first traffic category being transmitted by the network device using a respective bandwidth reservation on a communication link thereof;

wherein, in forwarding the packet in accordance with the stateless source routing encoded in the packet, the apparatus does not maintain flow-level information associated with the packet; and wherein the packet-processing circuitry is configured to implement a first queue for the packets of the first traffic category and a different second queue for the packets of the second traffic category, the first and second queues being connected to feed enqueued packets into the communication link.

2. The apparatus of claim 1, wherein the apparatus is configured to make the respective bandwidth reservation to meet quality-of-service obligation with respect to one or more flows of packets of the first traffic category.

3. The apparatus of claim 2, wherein the network device is a part of a network node configured to operate as an ingress node for at least one of the flows.

4. The apparatus of claim 2, wherein the network device is a part of a network node configured to operate as a transit node for at least one of the flows.

5. The apparatus of claim 2, wherein the network device is a part of a network node configured to operate as an egress node for at least one of the flows.

6. The apparatus of claim 1, wherein the packet-processing circuitry is further configured to:
implement a plurality of first queues for the packets of the first traffic category; and
enqueue the packets of the first traffic category into different ones of the first queues based on respective forwarding classes of the packets of the first traffic category.

7. The apparatus of claim 6, wherein the packet-processing circuitry is further configured to:
implement a plurality of second queues for the packets of the second traffic category; and
enqueue the packets of the second traffic category into different ones of the second queues based on respective forwarding classes of the packets of the second traffic category.

8. The apparatus of claim 1, wherein the packet-processing circuitry is further configured to:
implement a plurality of second queues for the packets of the second traffic category; and
enqueue the packets of the second traffic category into different ones of the second queues based on respective forwarding classes of the packets of the second traffic category.

9. The apparatus of claim 1, wherein the packet-processing circuitry is further configured to drop a received packet of the first traffic category when transmission of said received packet on the communication link would cause an oversubscription, by the packets of the first traffic category, of the respective bandwidth reservation.

10. The apparatus of claim 9, wherein the packet-processing circuitry is further configured to drop a received packet of the second traffic category when transmission of the received packet of the second traffic category on the communication link would cause a use of bandwidth by the packets of the second traffic category to exceed a difference between a total amount of bandwidth on the communication link and the respective bandwidth reservation.

11. The apparatus of claim 1, wherein the packet-processing circuitry is further configured to drop a received packet of the second traffic category when transmission of said received packet on the communication link would cause a use of bandwidth by the packets of the second traffic category to exceed a difference between a total amount of bandwidth on the communication link and the respective bandwidth reservation.

12. The apparatus of claim 1, wherein the packet-processing circuitry is further configured to use different respective traffic metrics for the first and second traffic categories for a decision to drop a received packet.

13. The apparatus of claim 1, wherein the network device is a part of an Internet Protocol network.

14. The apparatus of claim 1, wherein the network device is a part of a local area network configured to transmit packets using an Ethernet technology.

15. The apparatus of claim 1, wherein the network device is a part of a Multiprotocol Label Switching network.

16. An apparatus, comprising a network device that comprises:
at least one processor; and
at least one memory including program code; and
wherein the at least one memory and the program code are configured to, with the at least one processor, cause the network device at least to:
encode stateless source routing into a packet; and
encode a category indicator into a header of the packet for distinguishing packets belonging to a first traffic category and packets belonging to a second traffic category, the packets of the first traffic category being transmitted through a corresponding network using one or more bandwidth reservations on one or more respective communication links thereof, wherein, in transmitting the packet in accordance with the stateless source routing encoded in the packet, the apparatus does not maintain flow-level information associated with the packet.

17. The apparatus of claim 16, wherein the at least one memory and the program code are configured to, with the at least one processor, implement a first queue for the packets of the first traffic category and a different second queue for the packets of the second traffic category, the first and second queues being connected to feed enqueued packets to a corresponding one of the one or more respective communication links.

18. The apparatus of claim 17, wherein the at least one memory and the program code are further configured to, with the at least one processor:
implement a plurality of first queues for the packets of the first traffic category; and
enqueue the packets of the first traffic category into different ones of the first queues based on respective forwarding classes of the packets of the first traffic category.

19. The apparatus of claim 18, wherein the at least one memory and the program code are further configured to, with the at least one processor:
implement a plurality of second queues for the packets of the second traffic category; and
enqueue the packets of the second traffic category into different ones of the second queues based on respective forwarding classes of the packets of the second traffic category.

20. A non-transitory machine-readable medium, having encoded thereon program code, wherein, when the program code is executed by a machine, the machine implements a method comprising:
encoding stateless source routing into a packet; and
encoding a category indicator into a header of the packet for distinguishing packets belonging to a first traffic category and packets belonging to a second traffic category, the packets of the first traffic category being transmitted through a corresponding network using one or more bandwidth reservations on one or more respective communication links thereof, wherein, in transmitting the packet in accordance with the stateless source routing encoded in the packet, the machine does not maintain flow-level information associated with the packet.

21. The non-transitory machine-readable medium of claim 20, wherein, for a communication link, the respective bandwidth reservation is applied in aggregate to the packets of the first traffic category independent of how many different traffic flows are associated with the packets of the first traffic category.

22. The apparatus of claim 1, wherein, for the communication link, the respective bandwidth reservation is applied in aggregate to the packets of the first traffic category independent of how many different traffic flows are associated with the packets of the first traffic category.

23. The apparatus of claim 16, wherein, for a communication link, the respective bandwidth reservation is applied in aggregate to the packets of the first traffic category independent of how many different traffic flows are associated with the packets of the first traffic category.

24. An apparatus, comprising a network device that comprises packet-processing circuitry capable of forwarding a packet in accordance with source routing encoded in the packet, the packet-processing circuitry configured to distinguish packets belonging to a first traffic category and packets belonging to a second traffic category based on a category indicator encoded in a packet header, the packets of the first traffic category being transmitted by the network device using a respective bandwidth reservation on a communication link thereof;

wherein the packet-processing circuitry is configured to implement a first queue for the packets of the first traffic category and a different second queue for the packets of the second traffic category, the first and second queues being connected to feed enqueued packets into the communication link; and wherein the packet-processing circuitry is further configured to drop a received packet of the second traffic category when transmission of said received packet on the communication link would cause a use of bandwidth by the packets of the second traffic category to exceed a difference between a total amount of bandwidth on the communication link and the respective bandwidth reservation.

25. The apparatus of claim 24, wherein the packet-processing circuitry is further configured to drop a received packet of the first traffic category when transmission of said received packet on the communication link would cause an oversubscription, by the packets of the first traffic category, of the respective bandwidth reservation.

* * * * *